United States Patent
Ashikawa et al.

(10) Patent No.: US 12,216,997 B2
(45) Date of Patent: Feb. 4, 2025

(54) SUBTITLE GENERATING APPARATUS, SUBTITLE GENERATING METHOD, AND STORAGE MEDIUM

(71) Applicant: KABUSHIKI KAISHA TOSHIBA, Tokyo (JP)

(72) Inventors: Taira Ashikawa, Kawasaki Kanagawa (JP); Kenji Iwata, Machida Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 254 days.

(21) Appl. No.: 17/898,000

(22) Filed: Aug. 29, 2022

(65) Prior Publication Data
US 2023/0132418 A1    May 4, 2023

(30) Foreign Application Priority Data
Nov. 1, 2021  (JP) .................................. 2021-178498

(51) Int. Cl.
*G06F 40/279* (2020.01)
*G06F 40/205* (2020.01)
*G06F 40/268* (2020.01)

(52) U.S. Cl.
CPC .......... *G06F 40/279* (2020.01); *G06F 40/205* (2020.01); *G06F 40/268* (2020.01)

(58) Field of Classification Search
None
See application file for complete search history.

(56) References Cited

U.S. PATENT DOCUMENTS

| | | | |
|---|---|---|---|
| 8,539,349 B1 * | 9/2013 | Kirshenbaum | G06F 40/53 715/264 |
| 10,572,538 B2 | 2/2020 | Nagao | |
| 10,884,613 B2 * | 1/2021 | Wang | G06F 3/018 |
| 2008/0270118 A1 * | 10/2008 | Kuo | G06F 40/129 704/9 |

(Continued)

FOREIGN PATENT DOCUMENTS

| | | |
|---|---|---|
| JP | 6192104 B2 | 8/2017 |
| JP | 6543755 B1 | 6/2019 |
| JP | 6562698 B2 | 8/2019 |

OTHER PUBLICATIONS

Song, Hye-Jeong, et al. "Inter-sentence segmentation of youtube subtitles using long-short term memory (LSTM)." Applied Sciences 9.7 (2019): 1504. (Year: 2019).*

(Continued)

*Primary Examiner* — Douglas Godbold
(74) *Attorney, Agent, or Firm* — Holtz, Holtz & Volek PC

(57) ABSTRACT

According to one embodiment, a subtitle generating apparatus includes processing circuitry and a display. The processing circuitry is configured to sequentially acquire texts from voice recognition results. The processing circuitry is configured to store the texts as archive datasets. The processing circuitry is configured to estimate a split position and a concatenation position of the texts from one or more of the archive datasets, and generate a subtitle text from said one or more of the archive datasets based on the split position and the concatenation position. The processing circuitry is configured to update the archive datasets based on the split position and the concatenation position. The display is configured to display the subtitle text.

9 Claims, 10 Drawing Sheets

(56) References Cited

U.S. PATENT DOCUMENTS

| | | | | |
|---|---|---|---|---|
| 2009/0271193 A1* | 10/2009 | Miyamoto | ............... | G10L 15/22 |
| | | | | 704/235 |
| 2012/0002944 A1* | 1/2012 | Kamiwada | ............ | G11B 27/105 |
| | | | | 386/E5.003 |
| 2015/0363954 A1* | 12/2015 | Maurer | .................... | G06T 11/60 |
| | | | | 345/473 |
| 2017/0270080 A1* | 9/2017 | Sakamoto | .............. | G06F 40/106 |
| 2018/0279010 A1* | 9/2018 | Watanabe | ........... | H04N 21/4884 |
| 2020/0380068 A1* | 12/2020 | Navarro | ................ | G06F 40/126 |
| 2021/0150142 A1* | 5/2021 | Li | ........................ | G06F 16/3335 |
| 2022/0101852 A1* | 3/2022 | Nakadai | ................... | G06F 40/30 |
| 2022/0198158 A1* | 6/2022 | Tai | .......................... | G06F 40/53 |

OTHER PUBLICATIONS

Karakanta, Alina, Matteo Negri, and Marco Turchi. "MuST-cinema: a speech-to-subtitles corpus." arXiv preprint arXiv:2002.10829 (2020). (Year: 2020).*

Iizumi, et al., "Insert Line Breaks in Lecture Text Using RNNs for Easy-to-Read Subtitle Generation", Information Processing Society of Japan 82nd National Conference Proceedings, Mar. 6, 2020.

Komori, "The Latest Trends in Automatic Subtitle Production for Live Programs", NHK Science & Technical Research Laboratories, Special Issue on Image and Audio Processing Technology for Program Production, No. 182, Summer 2020.

\* cited by examiner

| Identification ID | Acquisition time | Text | Character string length | Already output character count | Split character position |
|---|---|---|---|---|---|
| 0 | 10:00:00 | 新型コロナウイルスワクチン | 13 | 13 | |
| 1 | 10:00:02 | の大規模接種 | 6 | 6 | 1 |
| 2 | | センターの | 5 | 5 | |
| 3 | | 予約が今日 | 5 | 3 | 3 |
| 4 | | からスタートしました | 10 | 0 | |
| 5 | | 東京会場 | 4 | 0 | |
| 6 | | となる合同庁舎 | 7 | 0 | | shingata-korona-uirusu-wakuchin (ID 0)
no-daikibo-sessyu (ID 1)
sentaa-no (ID 2)
yoyaku-ga-kyoo (ID 3)
kara-sutaato-shimashita (ID 4)
tookyoo-kaijyoo (ID 5)
tonaru-goodoochoosya (ID 6)

21a

Already output portion — 25

新型コロナウイルスワクチンの
大規模接種センターの予約が shingata-korona-uirusu-wakuchin-no-
daikibo-sessyu-sentaa-no-yoyaku-ga

F I G. 2

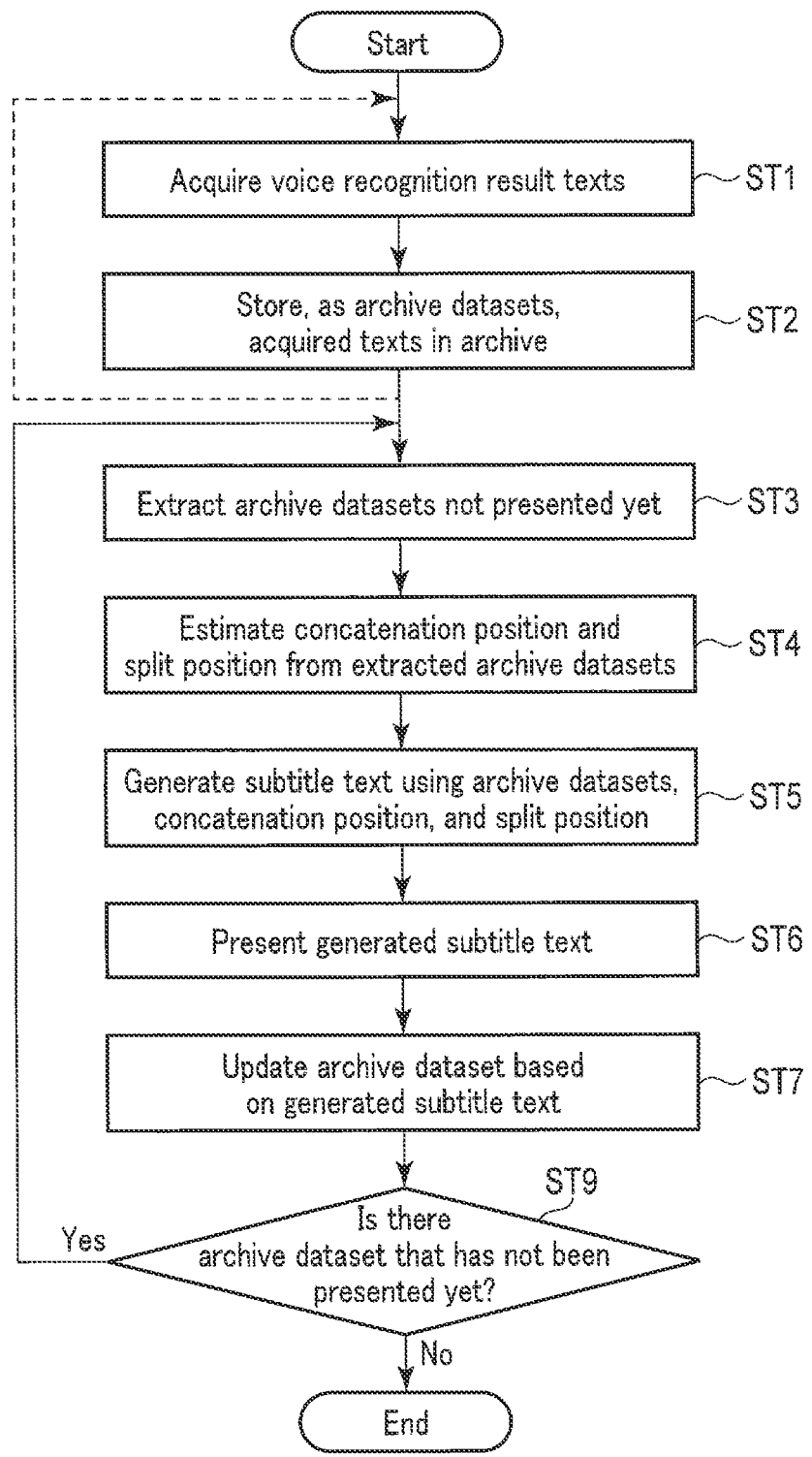
F I G. 3

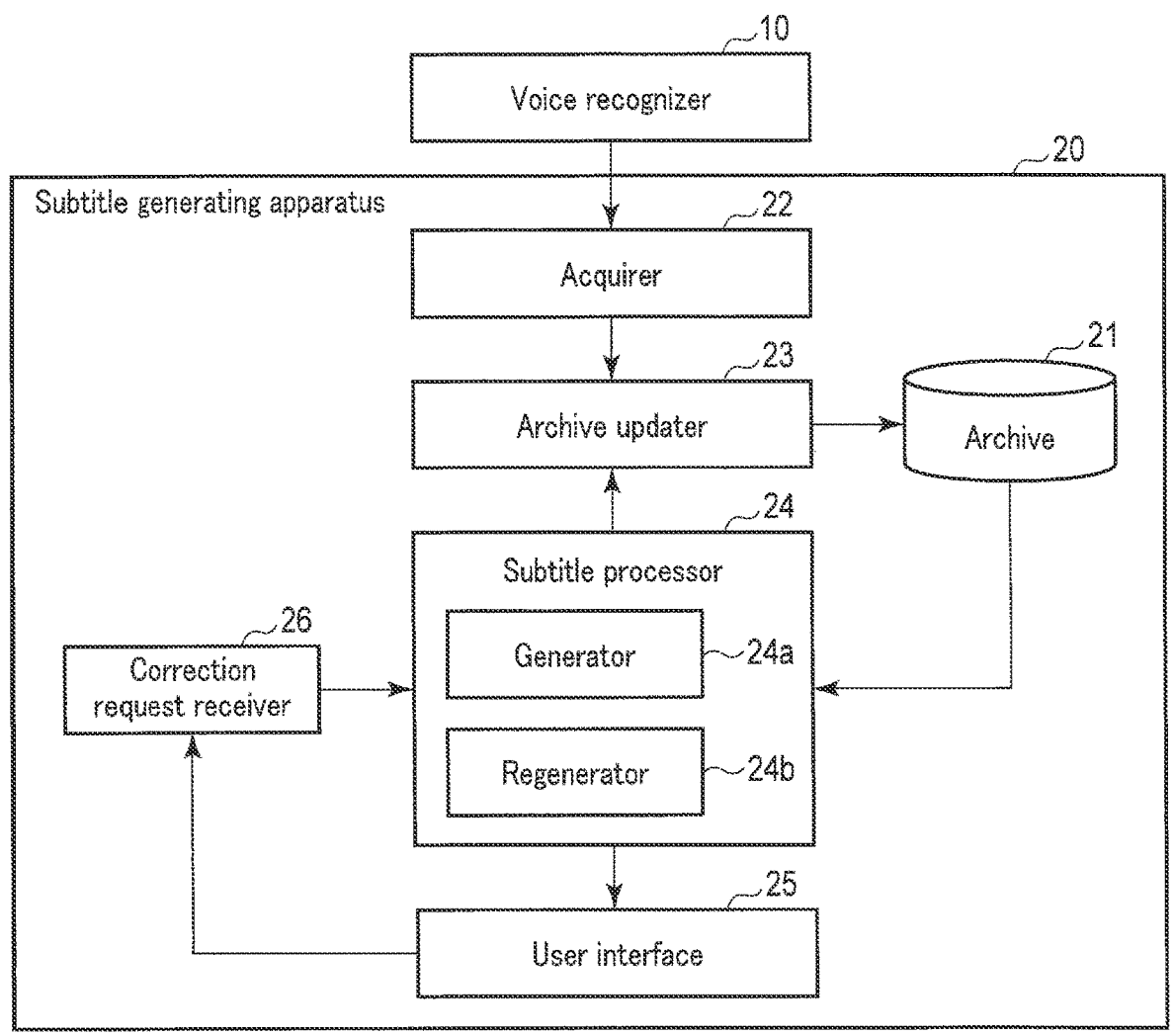
F I G. 5

SUBTITLE GENERATING APPARATUS, SUBTITLE GENERATING METHOD, AND STORAGE MEDIUM

CROSS-REFERENCE TO RELATED APPLICATION

This application is based upon and claims the benefit of priority from Japanese Patent Application No. 2021-178498, filed Nov. 1, 2021, the entire contents of which are incorporated herein by reference.

FIELD

Embodiments described herein relate generally to a subtitle generating apparatus, a subtitle generating method, and a storage medium.

BACKGROUND

Preparation of subtitles for television programs or the like utilizes a technique to automatically generate subtitles with the aid of voice recognition technology. While the accuracy of voice recognition has been rapidly improving in accordance with the development of deep learning technology, errors can occur in voice recognition due to background sounds, errors in speech, utterances that include technical terminology or jargon, and so on. As such, at the actual site of subtitle preparation, not all subtitles are prepared solely by voice recognition but many subtitles are first acquired by voice recognition and then manually checked and corrected to be finalized.

For news programs, etc., where subtitles are based on real-time voice recognition results, early acquisition of voice recognition results are desired so that the time for manual correction can be secured. One effective method for this purpose is a technique called "accelerated confirmation". Accelerated confirmation is a technique employed in pattern recognition operations including voice recognition, and it terminates a search in response to the number of candidates in the search space becoming small and outputs the recognition result at the termination timing. Accelerated confirmation is useful for applications that use voice recognition in real time. Nevertheless, accelerated confirmation terminates a search before the speech finishes, and each voice recognition result could be cut short. Alternatively, the search spaces in some instances are narrowed very little, and the voice recognition result obtained here could become long. Consequently, when the accelerated confirmation technique is employed in subtitle preparation, it must be assumed that increased human labor will be necessary in which corrections are made by combining the voice recognition results or by dividing the voice recognition result in order to improve the readability of subtitles.

As discussed above, the conventional subtitle generating apparatuses are accompanied by a large burden of making corrections for improved subtitle readability in subtitle preparing operations with real-time voice recognition results.

BRIEF DESCRIPTION OF THE DRAWINGS

FIG. 2 is a schematic diagram for explaining archive datasets according to the first embodiment.

FIG. 3 is a flowchart for explaining an exemplary operation in the first embodiment.

FIG. 5 is a block diagram showing an exemplary subtitle generating apparatus according to a second embodiment.

DETAILED DESCRIPTION

According to one embodiment, a subtitle generating apparatus includes processing circuitry and a display. The processing circuitry is configured to sequentially acquire texts from voice recognition results. The processing circuitry is configured to store the texts as archive datasets. The processing circuitry is configured to estimate a split position and a concatenation position of the texts from one or more of the archive datasets, and generate a subtitle text from said one or more of the archive datasets based on the split position and the concatenation position. The processing circuitry is configured to update the archive datasets based on the split position and the concatenation position. The display is configured to display the subtitle text.

The embodiments will be described with reference to the drawings. A subtitle generating apparatus according to each embodiment may be used for a system or the like in which, for example, voice recognition is performed in real time followed by manual checks and corrections for preparing subtitles for news programs, etc. Note that, in the disclosure of each embodiment herein, the meaning of "real time" is not limited to strict simultaneity such as "at the same moment" or "at the same time", but may involve delays due to, for example, data processing and communications. Also, names of the apparatus and components, such as a "subtitle generating apparatus", may be discretionarily replaced with other names as appropriate, such as an "automatic subtitle generator".

First Embodiment

Figure 1:
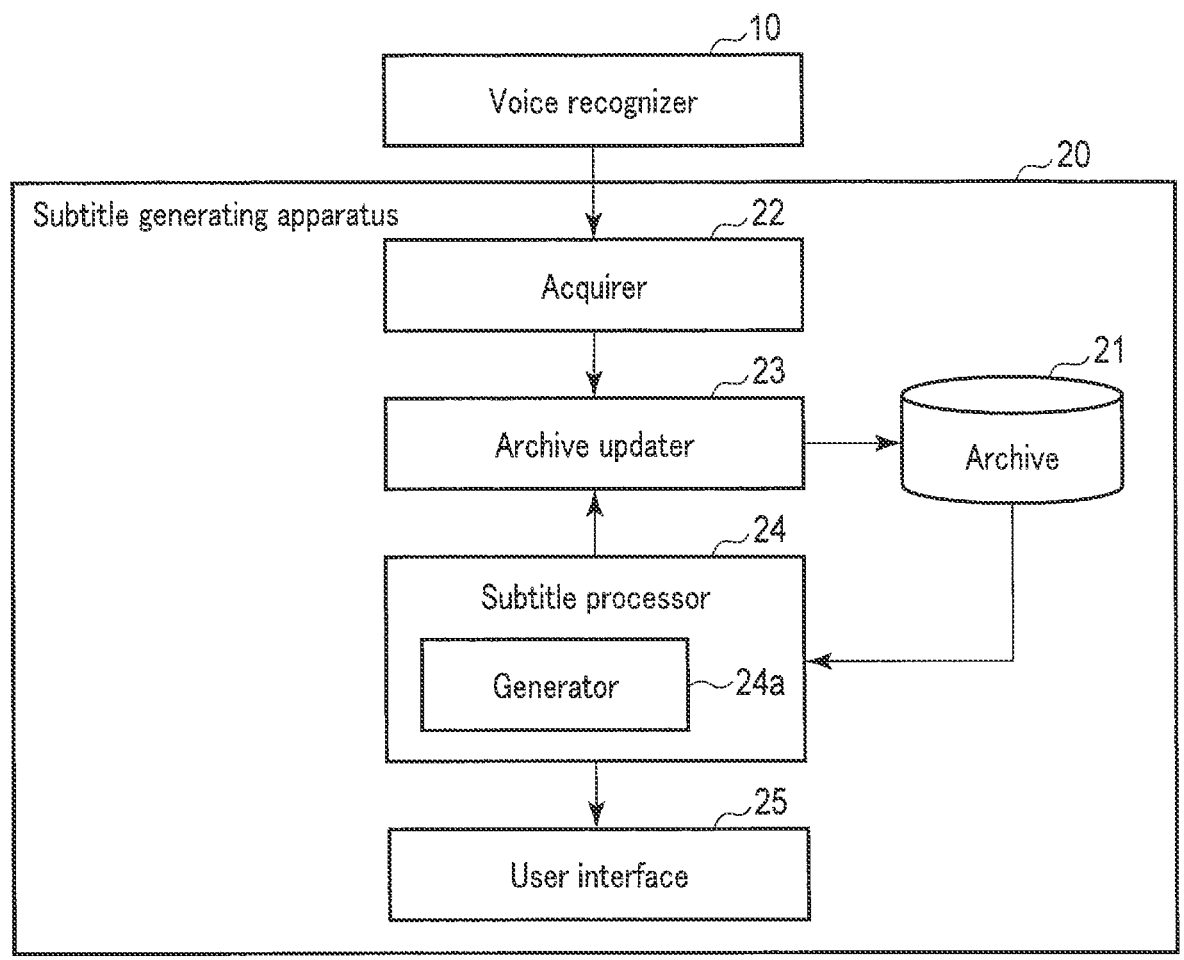
FIG. 1 is a block diagram showing an exemplary subtitle generating apparatus according to a first embodiment.

FIG. 1 is a block diagram showing a subtitle generating apparatus according to the first embodiment. In FIG. 1, a voice recognizer 10 is connected to a subtitle generating apparatus 20. The subtitle generating apparatus 20 includes an archive 21, an acquirer 22, an archive updater 23, a subtitle processor 24, and a user interface 25. The subtitle processor 24 includes a generator 24a.

The voice recognizer 10 here continuously acquires voice data and subjects the acquired voice data to a voice recognition process to generate one or more texts from the voice recognition results ("voice recognition result texts").

The archive 21 is a memory adapted to undergo write/read operations by the archive updater 23 and the generator 24a. In one example, the archive 21 stores archive datasets 21a for the acquired voice recognition result texts, and also data for the generation of subtitle texts based on the archive datasets 21a. As shown in FIG. 2, the archive datasets 21a are information including voice recognition result texts, sequentially acquired by the acquirer 22, and an already output character count and a split character position, each being an information item for a subtitle text generated by the generator 24a and each associated with the corresponding voice recognition result text. Note that the archive datasets 21a may also include, for each voice recognition result text, an identification ID, an acquisition time (date and time information), a character string length (the number of characters), and so on, in addition to the already output character count and the split character position.

Each identification ID is information identifying one of the sequentially acquired texts.

The acquisition time indicates the time at which the corresponding text has been acquired, and while not illustrated, it also includes an acquisition date. That is, the acquisition time is one example of acquisition date and time information.

The texts are sequentially acquired character strings each representing a voice recognition result. By way of example, it will be assumed that there is a sentence (a) given below, which is a Japanese sentence read as "shingata-korona-uirusu-wakuchin-no-daikibo-sessyu-sentaa-no-yoyaku-ga-kyoo-kara-sutaato-shimashita" and means in English that "Reservations at large-scale vaccination centers for vaccination against the new coronavirus have started today". This sentence has been acquired in pieces, sequentially in the order of text (b) (pronunciation: "shingata-korona-uirusu-wakuchin", corresponding meaning: "vaccination against the new coronavirus"), text (c) ("no-daikibo-sessyu"≈"large-scale vaccination . . . for"), text (d) ("sentaa-no"≈"at . . . centers"), text (e) ("yoyaku-ga-kyoo"≈"Reservations . . . today"), and text (f) ("kara-sutaato-shimashita"≈"have started"). Also, there is a partial Japanese sentence (g) given below, read as "tookyoo-kaijyoo-tonaru-goodoochoosya" and means in English "the joint government building, which will be a Tokyo venue". This partial sentence has been acquired in pieces, sequentially in the order of text (h) ("tookyoo-kaijyoo"≈"a Tokyo venue") and text (i) ("tonaru-goodoochoosya"≈"the joint government building which will be").

(a) 新型コロナウイルスワクチンの大規模接種センターの予約が今日からスタートしました

(b) 新型コロナウイルスワクチン

(c) の大規模接種

(d) センターの

(e) 予約が今日

(f) からスタートしました

(g) 東京会場となる合同庁舎

(h) 東京会場

(i) となる合同庁舎

The character string length indicates a length of a character string, i.e., a text. In other words, it indicates the number of characters that constitute a text.

The already output character count indicates the number of characters of a portion of a text which has already been output to the user interface 25 from the generator 24a. In the example shown in FIG. 2, the already output portion is (j) below ("shingata-korona-uirusu-wakuchin-no-daikibo-sessyu-sentaa-no-yoyaku-ga").

(j) 新型コロナウイルスワクチンの大規模接種センターの予約が

The split character position indicates the position of a character at which the text is split (i.e., where a line break is inserted) in the instances of text concatenation.

The data for the generation of subtitle texts may be a variety of data as will be described, including a current display candidate position CSI, a display candidate sequence, a character string length of a concatenated text, a maximum character count, a word identification WID, a feature vector, update information, a split estimation score, a word split position SWI, and so on.

The acquirer 22 sequentially acquires, from the voice recognizer 10, voice recognition result texts. Here, the subtitle generating apparatus 20 may include, as a replacement for the voice recognizer 10 and the acquirer 22, a voice recognizing unit adapted to continuously acquire voice data, subject the acquired voice data to a voice recognition process, and sequentially send the voice recognition result texts to the archive updater 23.

The archive updater 23 stores the voice recognition result texts, acquired by the acquirer 22, in the archive 21 in the form of the archive datasets 21a. The archive updater 23 also updates the archive datasets 21a in the archive 21, based on the information for a subtitle text generated by the generator 24a.

The generator 24a estimates a split position and a concatenation position of texts from one or more archive datasets 21a stored in the archive 21, and generates a subtitle text from the archive datasets 21a based on the split position and the concatenation position which have been estimated. The generator 24a here may continue the concatenation position estimation so as to concatenate the texts in the archive datasets, until the number of characters of the concatenated text obtained by the text concatenation reaches a threshold character number (the maximum character count) or greater. The generator 24a may subject the concatenated text obtained by the text concatenation to one or both of a morphological analysis and a dependency parsing, and generate a feature vector of each word based on the result of the analysis and/or the parsing. In this case, the generator 24a calculates a split estimation score for each word using the feature vector, and estimates the split position based on the split estimation scores.

The user interface 25 presents one or more subtitle texts generated by the generator 24a to a user. Examples of the user interface 25 include a display device adapted to display subtitle texts, a touch panel having a function of such a display device and also an input accepting function, and so on. The user interface 25 may further include a keyboard, a mouse, etc. for providing an input accepting function, in addition to the display device. Such an input accepting function may be discretionarily utilized for correcting the split position, the concatenation position, etc., of a subtitle text, errors in the voice recognition, and so on. The user interface 25 is an example of a presenter.

Next, operations of the subtitle generating apparatus 20 configured as above will be described with reference to the flowchart in FIG. 3 and the schematic diagram in FIG. 4.

(Step ST1)

The acquirer 22 sequentially acquires voice recognition result texts. More specifically, the voice recognizer 10 continuously subjects received voice data to a voice recognition process to generate voice recognition result texts as shown in FIG. 4. The acquirer 22 sequentially acquires, from the voice recognizer 10, voice recognition result texts. Note that, for the sake of reduced time lags, it is preferable that the acquired texts be those from voice recognition results that have employed the accelerated confirmation technique discussed above. However, no limitation is intended by this, and the texts may be those from voice recognition results that have employed a general estimation technique for speech segments.

Figure 4:
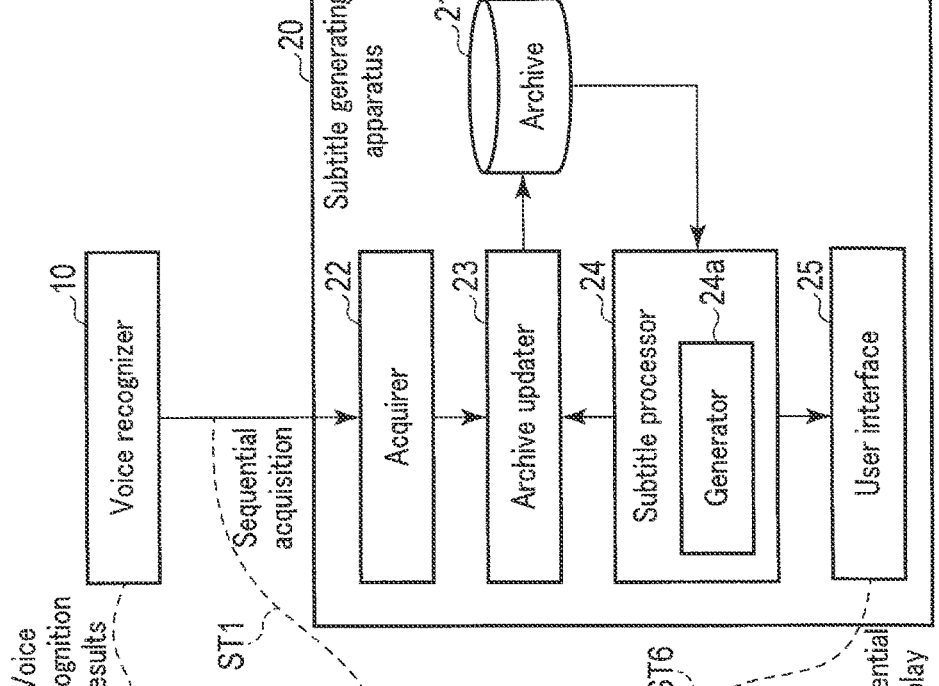
FIG. 4 is a schematic diagram for explaining an exemplary operation in the first embodiment.

In FIG. 4, the below sentence (k) is the same as already explained above. Also in FIG. 4, the sentence (l) given below is pronounced as "tookyoo-kaijyoo-tonaru-chiyodaku-no-ootemachi-goodoochoosya-dewa-sessyu-ni-ataru-jieitai-no-ikan-ya-kangokan-ra-ga-hensei-kanketsushiki-o-okonaimashita" and means in English that "The ikan-ya nurses of the self-defense officials handling the vaccination held an organization completion ceremony in the Otemachi Joint Government Building in Chiyoda-ku, which will be the Tokyo venue".

(k) 新型コロナウイルスワクチンの大規模接種センターの予約が今日からスタートしました

(l) 東京会場となる千代田区の大手町合同庁舎では接種に当たる自衛官のいかんや看護官らが編成完結式を行いました

(Step ST2)

The archive updater 23 stores, as archive datasets 21a, the acquired voice recognition result texts in the archive 21. In the example shown in FIG. 2, where the below speech (m) ("shingata-korona-uirusu-wakuchin-no-daikibo-sessyu-sentaa-no-yoyaku-ga-kyoo-kara-sutaato-shimashita. tookyoo-kaijyoo-tonaru-goodoochoosya") is given, texts such as (n) ("shingata-korona-uirusu-wakuchin"), (o) ("no-daikibo-sessyu"), and (p) ("sentaa-no"), sequentially acquired as the respective voice recognition result texts, are stored in the form of the archive datasets 21a. Each archive dataset 21a retains at least an identification ID for identifying the archive dataset 21a, an already output character count, and a split character position, together with the corresponding voice recognition result text. Here, the archive updater 23, upon acquisition of a voice recognition result text, creates new data including a fresh identification ID, an already output character count indicating a value 0, and information indicating an absence of a split character position, and stores the created data together with the voice recognition result text in the archive 21 as the archive dataset 21a. These steps ST1 and ST2 are repeated in parallel with the subsequent processes from step ST3.

(m) 新型コロナウイルスワクチンの大規模接種センターの予約が今日からスタートしました。東京会場となる合同庁舎

(n) 新型コロナウイルスワクチン
(o) の大規模接種
(p) センターの

(Step ST3)

The generator 24a extracts, among the archive datasets 24a stored in the archive 21, one or more archive datasets 21a that have not been presented as a subtitle text yet.

By way of example, it will be assumed that the archive datasets 21a in the archive 21 form a sequence called an "archive data sequence". More specifically, and for example, the archive data sequence includes seven archive datasets 21a containing the texts identified by the respective identification IDs from 0 to 6. In one example, the archive datasets 21a are constituted, respectively, by [identification ID=0 and text (q) below (shingata-korona-uirusu-wakuchin)], [identification ID=1 and text (r) below (no-daikibo-sessyu)], [identification ID=2 and text (s) below (sentaa-no)], [identification ID=3 and text (t) below (yoyaku-ga-kyoo)], [identification ID=4 and text (u) below (kara-sutaato-shimashita)], [identification ID=5 and text (v) below (tookyoo-kaijyoo)], and [identification ID=6 and text (w) below (tonaru-goodoochoosya)]. It will also be assumed that the maximum character count of a subtitle text to be generated is predetermined to be 30.

(q) 新型コロナウイルスワクチン
(r) の大規模接種
(s) センターの
(t) 予約が今日
(u) からスタートしました
(v) 東京会場
(w) となる合同庁舎

The generator 24a initially resets a current display candidate position CSI in the archive data sequence, a display candidate sequence that covers one or more archive datasets 21a in the archive data sequence, and a character string length of a concatenated text obtained by concatenating the texts in the respective archive datasets 21a included in the display candidate sequence.

The generator 24a repeats the operation below if the size of the archive data sequence exceeds the size determined by the current display candidate position CSI, namely, in the case where the archive data sequence includes one or more archive datasets 21a that have not been presented as a subtitle text yet.

First, upon extracting the CSI-th archive dataset 21a from the archive data sequence, the generator 24a increments the current display candidate position CSI by one and adds the extracted archive dataset 21a to the display candidate sequence.

Next, the generator 24a subtracts the already output character count of the archive dataset 21a from the character string length of the voice recognition result text in the archive dataset 21a, and adds the obtained value to the character string length of a concatenated text. If this character string length of the concatenated text is larger than the maximum character count of a subtitle text to be generated, the generator 24a advances to step ST4 for improving the readability of the concatenated text.

For example, in the case of the current display candidate position CSI being 0, the below text (x) ("shingata-korona-uirusu-wakuchin") in the 0-th archive dataset 21a (with the identification ID=0) is acquired from the archive data sequence, and this archive dataset 21a is added to the display candidate sequence. Here, the character string length of the archive dataset 21a with the identification ID=0 is 13, and the already output character count of this archive dataset 21a is 0; therefore, the character string length of a concatenated text equals 13. Subsequently, the processing similarly proceeds in such a manner that the current display candidate position CSI is incremented by one and the next CSI-th archive dataset 21a is extracted and added to the display candidate sequence. Accordingly, by the time the character string length of the concatenated text exceeds the maximum character count (30 characters), the archive datasets 21a with the respective identification IDs of 0 to 4 have been added to the display candidate sequence. Further, the texts in the respective archive datasets 21a with the identification IDs of 0 to 4 here are the below (y) ("shingata-korona-uirusu-wakuchin"), (z) ("no-daikibo-sessyu"), (aa) ("sentaa-no"), (bb) ("yoyaku-ga-kyoo"), and (cc) ("kara-sutaatoshimashita"). As such, the character string length of the concatenated text in this example becomes 39 (=13+6+5+5+10).

(x) 新型コロナウイルスワクチン
(y) 新型コロナウイルスワクチン
(z) の大規模接種
(aa) センターの
(bb) 予約が今日
(cc) からスタートしました

(Step ST4)

The generator 24*a* estimates a concatenation position and a split position based on the text in the extracted archive dataset 21*a*. In one example, the generator 24*a* performs the concatenation position estimation so as to concatenate the texts in the archive datasets 21*a*, until the number of characters of the concatenated text obtained by the text concatenation reaches the maximum character count (a threshold character number) or greater. Also in one example, the generator 24*a* performs the split position estimation based on the display candidate sequence, and then advances to step ST5. As one concrete example, the split position estimation may refer to the context.

First, the generator 24*a* resets a concatenated text obtained by concatenating the texts in the display candidate sequence, and also resets update information for the archive datasets 21*a*.

The generator 24*a* then stores, as the update information, the correspondence between the identification ID of the archive dataset 21*a* and a text start position for each of the archive datasets 21*a* in the display candidate sequence, and generates a concatenated text by concatenating the texts in the archive datasets 21*a* until the maximum character count or greater is reached.

Suppose that the texts in the respective archive datasets 21*a* with the identification IDs of 0 to 4 are the below (dd) ("shingata-korona-uirusu-wakuchin"), (ee) ("no-daikibo-sessyu"), (ff) ("sentaa-no"), (gg) ("yoyaku-ga-kyoo"), and (hh) ("kara-sutaato-shimashita"). In this case, the update information contains [identification ID=0 and a text start position "0"], [identification ID=1 and a text start position "13"], [identification ID=2 and a text start position "19"], [identification ID=3 and a text start position "24"], and [identification ID=4 and a text start position "29"]. Note that each text start position conforms to the character string length up to the text (inclusive) immediately preceding the text of concern in the concatenated text. The concatenated text as below (ii) ("shingata-korona-uirusu-wakuchin-no-daikibo-sessyu-sentaa-no-yoyaku-ga-kyoo-kara-sutaato-shimashita") is generated. As discussed above, the character string length of this concatenated text is 39, which is an outcome of performing the text concatenation until the maximum character count or greater is reached.

(dd) 新型コロナウイルスワクチン
(ee) の大規模接種
(ff) センターの
(gg) 予約が今日
(hh) からスタートしました
(ii) 新型コロナウイルスワクチンの大規模接種センターの予約が今日からスタートしました

Next, the generator 24*a* subjects the concatenated text obtained by the text concatenation to one or both of a morphological analysis and a dependency parsing, and generates a feature vector of each word based on the result of the analysis and/or the parsing. The generator 24*a* also calculates a split estimation score for each word using the feature vector, and estimates the split position based on the split estimation scores.

More specifically, and for example, the generator 24*a* conducts a morphological analysis on the concatenated text and generates, based on the result of the morphological analysis, word sequences in which words are associated with respective word identifications WID. For example, the generated word sequences are [word identification WID=0 and word (jj) below ("shingata-korona-uirusu"≈"the new coronavirus")], [word identification WID=1 and word (kk) below ("wakuchin"≈"vaccination against")], [word identification WID=2 and word (ll) below ("no"≈"for")], [word identification WID=3 and word (mm) below ("daikibo-"≈"large-scale")], [word identification WID=4 and word (nn) below ("sessyu"≈"vaccination")], [word identification WID=5 and word (oo) below ("sentaa"≈"centers")], [word identification WID=6 and word (pp) below ("no"≈"at")], [word identification WID=7 and word (qq) below ("yoyaku"≈"Reservations")], [word identification WID=8 and word (rr) below ("ga", which has no corresponding English word)], [word identification WID=9 and word (ss) below ("kyoo"≈"today")], [word identification WID=10 and word (tt) below ("kara", which has no corresponding English word)], [word identification WID=11 and word (uu) below ("sutaato"≈"start")], [word identification WID=12 and word (vv) below ("shi", which has no corresponding English word)], [word identification WID=13 and word (ww) below ("mashi", which has no corresponding English word)], and [word identification WID=14 and word (xx) below ("ta""have . . . ed")].

(jj) 新型コロナウイルス
(kk) ワクチン
(ll) の
(mm) 大規模
(nn) 接種
(oo) センター
(pp) の
(qq) 予約
(rr) が
(ss) 今日
(tt) から
(uu) スタート
(vv) し
(ww) まし
(xx) た

Subsequently, the generator 24*a* associates the identification ID of each archive dataset 21*a* with one or more corresponding word identifications WID for the generated word sequences using the text start positions retained in the update information, and puts these associations in the update information.

For example, in the case of the archive datasets 21*a* with the identification IDs of 0 to 4 (namely, in the case of handling the below text (yy) ("shingata-korona-uirusu"), text (zz) ("no-daikibo-sessyu"), text (aaa) ("sentaa-no"), text (bbb) ("yoyaku-ga-kyoo"), and text (ccc) ("kara-sutaato-shimashita"), the following associations are put in the update information.

<Identification ID=0 & word (ddd) below ("shingata-korona-uirusu") with WID=0 and word (eee) below ("wakuchin") with WID=1>
<Identification ID=1 & word (fff) below ("no") with WID=2, word (ggg) below ("daikibo") with WID=3, and word (hhh) below ("sessyu") with WID=4>

<Identification ID=2 & word (iii) below ("sentaa") with WID=5 and word (jjj) below ("no") with WID=6>
<Identification ID=3 & word (kkk) below ("yoyaku") with WID=7, word (lll) below ("ga") with WID=8, and word (mmm) below ("kyoo") with WID=9>
<Identification ID=4 & word (nnn) below ("kara") with WID=10, word (ooo) below ("sutaato") with WID=11, word (ppp) below ("shi") with WID=12, word (qqq) below ("mashi") with WID=13, and word (rrr) below ("ta") with WID=14>
(yy) 新型コロナウイルスワクチン
(zz) の大規模接種
(aaa) センターの
(bbb) 予約が今日
(ccc) からスタートしました
(ddd) 新型コロナ ウイルス
(eee) ワクチン
(fff) の
(ggg) 大規模
(hhh) 接種
(iii) センター
(jjj) の
(kkk) 予約
(lll) が
(mmm) 今日
(nnn) から
(ooo) スタート
(ppp) し
(qqq) まし
(rrr) た

The generator 24a then generates a feature vector of each word for the word sequences. Examples of features available as the feature vector here include a word index assigned to each word from the beginning of a sentence, a character length, a word class, a result of dependency parsing, and so on.

Next, the generator 24a calculates, based on the generated feature vectors, split estimation scores indicative of whether or not a split should be introduced before the respective words. This calculation may use a trained model. As the trained model here, for example, a deep learning model may be employed as appropriate. Examples of the deep learning model here include a deep neural network (DNN) model of the N-gram technology. In this case, the generator 24a puts together the feature vectors of the N words arranged before and after each word, and inputs the resultant single vector to the DNN model to calculate the split estimation score for each word by the DNN model.

The generator 24a then determines a word split position SWI indicating a point in the words at which a split is introduced, from the split estimation scores. In one example, the word split position SWI is set to a position immediately preceding the word having the largest split estimation score. Instead, multiple word split positions SWI may be set to positions immediately preceding the respective several top-ranked words showing split estimation scores equal to or greater than a threshold.

More specifically, and for example, suppose that the word split positions SWI=[3,9] are set. In this case, the word split positions SWI indicate that the position immediately preceding the word (sss) below ("daikibo") with the word identification WID=3, and also the position immediately preceding the word (ttt) below ("kyoo") with the word identification WID=9 are positions where a split is introduced. In other words, the position SWI=[3] of the word split positions SWI=[3,9] indicates a point between the word (uuu) below ("no") with WID=2 and the word (sss) below ("daikibo") with WID=3. Similarly, the position SWI=[9] of the word split positions SWI=[3,9] indicates to a point between the word (vvv) below ("ga") with WID=8 and the word (www) below ("kyoo") with WID=9.

(sss) 大規模
(ttt) 今日
(uuu) の
(vvv) が
(www) 今日

Upon obtaining the word sequences and the word split position or positions SWI, the operation advances to step ST5 where a subtitle text is generated.

(Step ST5)

The generator 24a generates a subtitle text using the extracted one or more archive datasets 21a, the estimated concatenation position or positions, and the estimated split position or positions. Also, the generator 24a generates update information necessary for updating each archive dataset 21a. For example, the generator 24a generates update information by referring to the word index of each word and the text start position of the archive dataset 21a retained in the update information, picking up a portion of the update information that covers the word concerned, and adding an output character count to this update information portion.

By way of example, the description will suppose the word split positions SWI=[3,9] discussed above. The generator 24a here generates the subtitle text (xxx) below ("shingata-korona-uirusu-wakuchin-no (\n) daikibo-sessyu-sentaa-no-yoyaku-ga") from the display candidate sequence including the archive datasets 21a with the identification IDs of 0 to 4, and also generates the update information retaining the identification IDs of the respective archive datasets 21a and the output character count. The below (yyy) ("(\n)") indicates a line break at the split position. Note that this symbol is not pronounced but is included in the pronunciation clause for comprehension of the line break in the subtitle text. The update information retains, for example, [identification ID=0 and an already output character count "13"], [identification ID=1 and an already output character count "6"], [identification ID=2 and an already output character count "5"], [identification ID=3 and an already output character count "3"], and [identification ID=4 and an already output character count "0"].

(xxx) 新型コロナウイルスワクチンの¥n大規模 接種センターの予約が
(yyy) ¥n (Step ST6)

The user interface 25 presents the generated subtitle text to a user. In one example, the user interface 25 sequentially presents the subtitle texts each within two lines as shown in FIG. 4. The generator 24a resets the display candidate sequence and the character string length of the concatenated text.

(Step ST7)

The archive updater 23 updates the archive datasets 21a stored in the archive 21, based on the generated subtitle text. For example, the archive updater 23 updates the archive data sequence based on the update information for the archive datasets 21a. The archive updater 23 also updates, based on the update information, the current display candidate position CSI to a position of the archive dataset 21*a* that contains an undisplayed portion.

For example, in the case of the update information discussed for step ST5 above, the text character string length "5" and the already output character count "3" for the archive dataset 21*a* with the identification ID=3 do not conform to each other, and therefore, updating is performed accordingly.

(Step ST9)

The generator 24*a* determines whether or not there is an archive dataset 21*a* that has not been presented yet, and if there is an unpresented archive dataset 21*a*, repeats the processing from step ST3 to step ST9. If, on the other hand, there is no unpresented archive dataset 21*a*, the operation is terminated.

As described above, according to the first embodiment, the acquirer 22 sequentially acquires voice recognition result texts. The archive 21 stores these texts as archive datasets 21*a*. The generator 24*a* estimates a split position and a concatenation position of texts from the stored one or more archive datasets 21*a*. The generator 24*a* generates a subtitle text from the one or more archive datasets 21*a* using the split position and the concatenation position. The archive updater 23 updates the archive datasets 21*a* based on the split position and the concatenation position. The user interface 25, serving as a presenter, presents the subtitle text. Therefore, in real-time subtitle preparation from voice recognition results, the first embodiment can mitigate the burden of making corrections for improved subtitle readability.

Moreover, the embodiment realizes the automatic generation of subtitle texts that take into account the readability in real-time subtitle preparation utilizing the voice recognition technology. Thus, the costs necessitated by the corrections done by the subtitle preparing staff can be reduced. Also, in the case of adopting the accelerated confirmation technique for the voice recognition results, more time can be secured for the corrections.

Comparative examples (1) to (3) contrasting the above first embodiment will be noted.

(1) The first comparative example is a case of adopting a technique that estimates line break positions in drafted texts so that the readability of subtitles can be improved. In the technique of the first comparative example, in order to improve subtitles for a lecture, etc., a recurrent neural network (RNN), i.e., a deep learning technique, is applied to the drafted lecture texts to estimate whether or not a line break should be inserted before the text segments. However, since the first comparative example estimates the line break positions using the all-finished lecture texts, it is not suitable for real-time subtitle preparation. That is, the first comparative example is a technique that is not suitable for the operations of sequentially acquiring and displaying recognition results and making manual corrections, and the first comparative example is not practically applicable to real-time subtitle preparations such as for news programs.

(2) The second comparative example is a case of adopting a technique that adjusts the output and the reproduction of voice data for subtitle preparation, according to the number of characters of voice recognition result texts. The second comparative example has nothing to do with the readability of prepared subtitles. As such, the second comparative example requires manual corrections to form subtitles that take into account the readability, and it incurs a large cost in manual corrections.

(3) The third comparative example is a case of adopting a technique that enables a voice recognition result to be corrected through designation of a portion to be corrected via a touch panel, etc., and reproduces the speech. The third comparative example is, however, not a technique to sequentially and continuously perform corrections, and as such, it is not applicable to real-time subtitle preparations.

Therefore, none of the comparative examples (1) to (3) are suitable for the real-time generation of easy-to-read subtitles, and these comparative examples cannot provide the advantages of the first embodiment described above.

Also according to the first embodiment, the generator 24*a* continues to estimate concatenation positions to concatenate texts in the archive datasets, until the number of characters of the concatenated text obtained by the text concatenation reaches a threshold character number (the maximum character count) or greater. Therefore, since a split position can be estimated from a concatenated text having a character number slightly exceeding the threshold character number, the embodiment, in addition to the advantages described above, allows for the generation of subtitle texts each having a character number close to the threshold character number. In other words, the embodiment enables generation of as many subtitle texts as the display permits, and can consequently reduce the delay in subtitle display.

According to the first embodiment, the generator 24*a* subjects the concatenated text obtained by the text concatenation to one or both of a morphological analysis and a dependency parsing, and generates a feature vector of each word based on the result of the analysis and/or the parsing. The generator 24*a* calculates a split estimation score for each word using the feature vector, and estimates the split position based on the split estimation scores. Therefore, since the split positions can be estimated from the concatenated text without requiring a human work, the embodiment can further mitigate the burden of making corrections for improved subtitle readability, in addition to the advantages described above.

Modifications of First Embodiment

The first embodiment may be implemented in the manner as in the following modifications. Note that these modifications are likewise applicable to each of the other embodiments disclosed below.

First, while the first embodiment has assumed the use of feature vectors, this is not a limitation. For example, the feature vectors may be replaced with word vectors for which a word embedding technique is utilized. In this case, the generator 24*a* subjects a concatenated text obtained by text concatenation to one or both of a morphological analysis and a dependency parsing, generates an embedded vector of each word based on the result of the analysis and/or the parsing, calculates a split estimation score for each word using the embedded vector, and estimates the split position based on the split estimation scores. Such an implementation can also realize the same advantages as discussed above for the first embodiment.

Next, while the first embodiment has assumed the use of a DNN model of the N-gram technology, this is not a limitation. For example, the N-gram DNN model may be replaced with a recurrent neural network (RNN) model. In this case, an RNN model which uses the feature vector of each word as an input and calculates the split estimation score for each word may be used. Also, the RNN model may have either a unidirectional configuration that takes into account the context on one side of a word of interest, or a bidirectional configuration that takes into account the context on both sides. More specifically, and for example, the generator 24a may calculate the split estimation score for each word using an LSTM model that takes into account the context before the word, the context after the word, or the context before and after the word. Here, LSTM stands for "Long Short-Term Memory".

Also, while the first embodiment has assumed that the subtitle text generating operation is constituted by word-by-word processing, this is not a limitation. For example, the word-by-word processing may be replaced with processing that handles each segment, i.e., a group of one or more words, as a unit and uses feature vectors obtained for each segment. In this case, the generator 24a subjects a concatenated text obtained by text concatenation to one or both of a morphological analysis and a dependency parsing, generates a feature vector of each segment by putting together the result of the analysis and/or the parsing for each segment, calculates a split estimation score for each segment using the feature vector, and estimates the split position based on the split estimation scores. Such an implementation can also realize the same advantages as discussed above for the first embodiment.

The first embodiment has been described without assuming the deletion of unwanted words or portions such as meaningless fillers, symbols, or parts of speech, or particular character strings. However, this is not a limitation. The embodiment may adopt a configuration to delete these unwanted words, etc., during the subtitle text generation. In this case, the generator 24a may perform a process to delete the unwanted words, etc. after the morphological analysis, give their positions in the texts to the update information, and have each archive dataset reflect the update information at the time of the update.

While the first embodiment has assumed a subtitle text generating process where split estimation scores are calculated and split positions are estimated from the calculated split estimation scores, this is not a limitation. For example, the subtitle text generating process may use predetermined split positions so that the texts are split at such predetermined fixed split positions.

The first embodiment has assumed that the generator 24a continues to estimate concatenation positions to concatenate texts in the archive datasets 21a, until the number of characters of the concatenated text obtained by the text concatenation reaches a threshold character number (the maximum character count) or greater. However, this is not a limitation. For example, the generator 24a may estimate one or more split positions for the concatenated text obtained by the text concatenation, according to a fixed character number differing from the threshold character number. The fixed character number may be any number smaller than the maximum character count.

The first embodiment has assumed that the split position estimation is performed irrespective of the number of non-displayed archive datasets in the archive data sequence. However, this is not a limitation. That is, the embodiment may change the model or processing to estimate the split positions according to the number of archive datasets that have not been displayed yet in the archive data sequence. More specifically, and for example, if an increasing number of archive datasets 21a is accumulating, they should be promptly presented to the user. Thus, the split position estimation is performed using a fixed character number that entails a lower calculation amount. That is, if the number of archive datasets 21a in the archive 21, which contain the texts not yet presented as subtitle texts, is a threshold number or greater, the generator 24a estimates the split positions using a fixed character number. On the other hand, upon the number of archive datasets 21a falling below a given value, the generator 24a calculates split estimation scores using the split estimation model, which assures a higher accuracy but requires a larger calculation amount. That is, if the number of archive datasets 21a in the archive 21, which contain the texts not yet presented as subtitle texts, is less than the threshold number, the generator 24a estimates the split positions by calculating the split estimation scores.

Further, the first embodiment may also estimate the split positions such that the resulting text length will be longer than the length corresponding to one screen at the head and tail parts. More specifically, and for example, the processing for adding archive datasets 21a to a display candidate sequence is performed until the character number of the concatenated text equals or exceeds the character number corresponding to the sum of the maximum character count for one screen display and additional characters (+a characters), and the split position estimation is then performed as described above. In this case, the split positions for generating a subtitle text may be estimated so that the character string at the head part that has been already displayed in the past and the character string at the tail part that exceeds the maximum character count are excluded from the subtitle text.

While the first embodiment has assumed that the addition of an archive dataset 21a to the display candidate sequence is determined according to the maximum character count for one screen display, this is not a limitation. For example, instead of the determination based on the maximum character count, voice recognition result texts may be stored in the archive 21 in association with their respective acquisition times (date and time information) so that the archive dataset that has not been displayed for a given period of time or longer since its acquisition time is added to the display candidate sequence. In this case, each archive dataset 21a contains a voice recognition result text and the acquisition time of this text. The generator 24a estimates one or more concatenation positions so as to concatenate one or more texts in the archive datasets 21a that have not been displayed for a given period of time or longer since the corresponding acquisition time. The given period of time is, for example, 10 seconds. Note that the period of time here is not limited, and may be any period discretionarily selected from, for example, a range of 1 second to 10 seconds.

Second Embodiment

By comparison, the second embodiment differs from the first embodiment in that it additionally includes a configuration for correcting the split position and the concatenation position of subtitle texts displayed through the user interface 25, in response to the user action (operation) on a part, etc. of the displayed subtitle text. Note that "action" may be replaced with "operation".

FIG. 5 is a block diagram showing an exemplary subtitle generating apparatus according to the second embodiment. The description will use the same reference symbols for the same or substantially the same components or features that appear in FIG. 1, and will in principle omit details of such components, etc. The description will basically concentrate on portions differing from the already explained portions. The subsequent embodiments will each be described in a similar manner, and redundant explanations will basically be omitted.

By comparison, the subtitle generating apparatus 20 shown in FIG. 5 has a configuration differing from the configuration shown in FIG. 1 in that the subtitle processor 24 further includes a regenerator 24b, and a correction request receiver 26 is additionally provided between the regenerator 24b and the user interface 25.

Accordingly, in addition to the configuration described above, the user interface 25 here detects a user action on a portion of the presented subtitle text and generates action data. This user interface 25 is an example of a detector.

The correction request receiver 26 determines, based on the action data, a correction subject range in the subtitle text and also a request type for either a split or a concatenation of the subtitle text. In one example, the correction request receiver 26 performs the determination upon receipt of the action data serving as a correction request. The correction request receiver 26 is an example of a determiner.

The regenerator 24b re-estimates a split position or a concatenation position of the subtitle text based on the correction subject range, the request type, and the archive datasets 21a, and regenerates a subtitle text using the re-estimation result.

Figure 6:
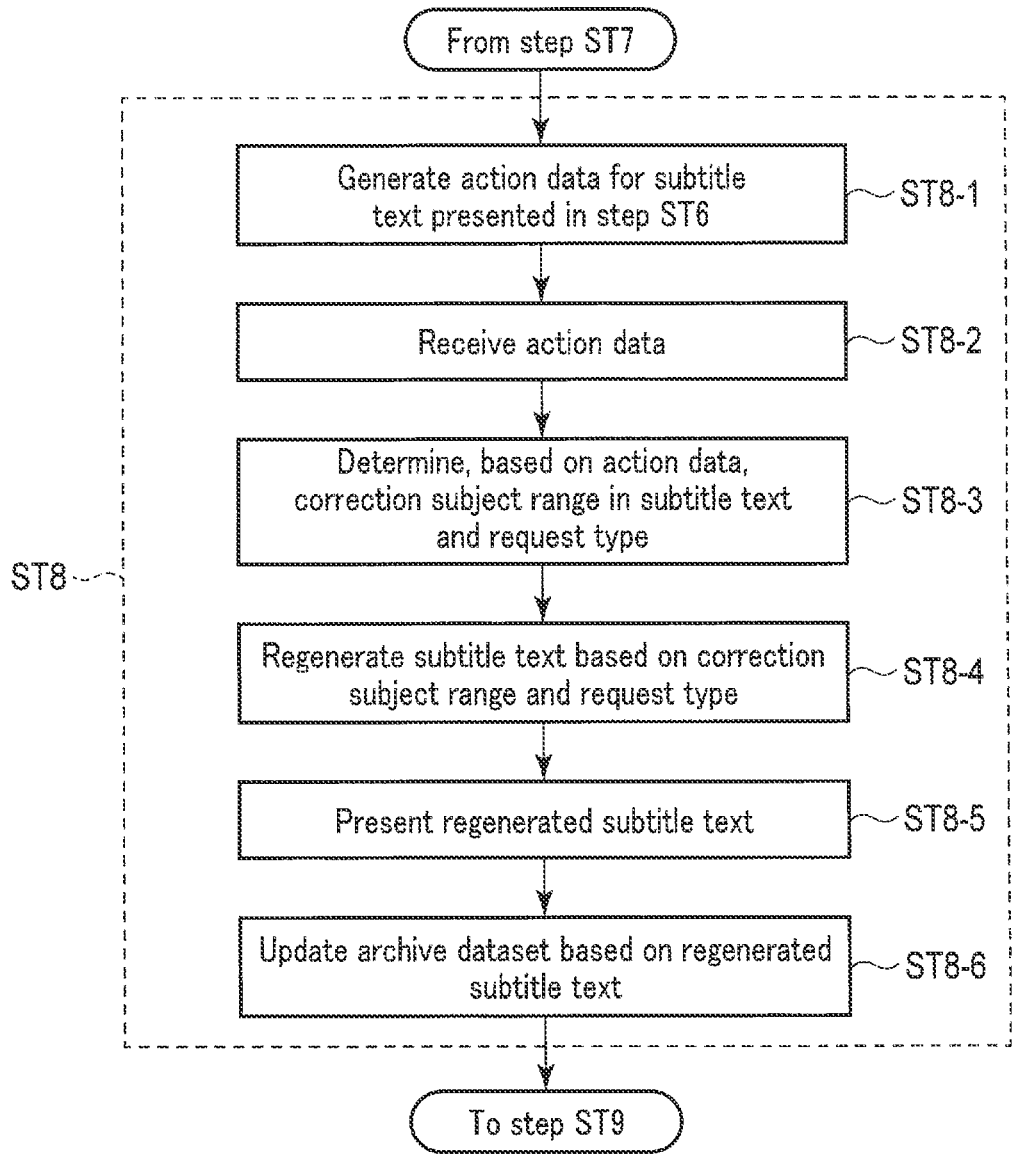
FIG. 6 is a flowchart for explaining an exemplary operation in the second embodiment.
Figure 7:
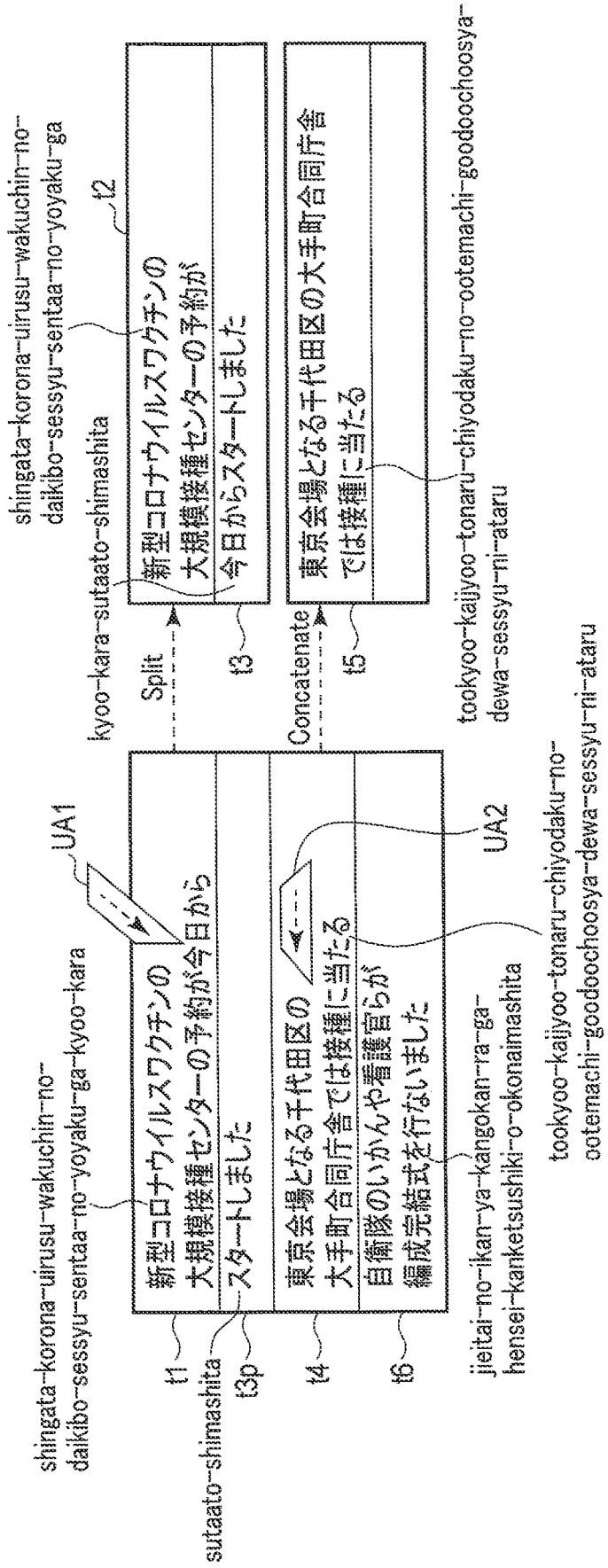
FIG. 7 is a schematic diagram for explaining an exemplary operation in the second embodiment.

Operations of the subtitle generating apparatus 20 configured as above will be described with reference to the flowchart in FIG. 6 and the schematic diagram in FIG. 7. In particular, the operations of the present embodiment are performed as step ST8 set between steps ST7 and ST9 described above. Step ST8 is constituted by steps ST8-1 to ST8-6, which proceed as follows.
(Step ST8-1)

The user interface 25, in response to an action by a user on a portion of the subtitle text that has been displayed according to step ST6, detects the user action and generates action data. More specifically, suppose that an action such as moving a cursor, clicking, dragging, flicking, swiping, or the like is done in association with the currently displayed subtitle text. The user interface 25 here generates, as the action data, information including a start position on the screen where the action has started and an end position on the screen where the action has ended.
(Step ST8-2)

The user interface 25 sends the action data to the correction request receiver 26. The correction request receiver 26 receives the action data.
(Step ST8-3)

The correction request receiver 26 then determines, based on the action data, a correction subject range in the subtitle text and also a request type for either a split or a concatenation of the subtitle text.
(Step ST8-4)

The regenerator 24b re-estimates a split position or a concatenation position of the subtitle text based on the correction subject range in the subtitle text, the request type, and the archive datasets 21a, and regenerates a subtitle text using the re-estimation result.
(Step ST8-5)

The user interface 25 presents the regenerated subtitle text to the user.
(Step ST8-6)

The archive updater 23 updates the archive datasets 21a stored in the archive 21, based on the regenerated subtitle text. The subtitle generating apparatus 20 thus finishes step ST8 constituted by these steps ST8-1 to ST8-6 and advances to the above described step ST9.

Next, concrete examples as to how the above described operations are performed for the respective request types, i.e., a split request and a concatenation request for a subtitle text, will be explained with reference to the schematic diagram in FIG. 7. The explanation will assume an implementation where the user interface 25 is a touch panel, but this is not a limitation. This applies to each of the other embodiments disclosed below. Here, it will be assumed that time t1 to time t3 relate to an example of the operations for a split, and time t4 to time t6 relate to an example of the operations for a concatenation.
(Timt t1)

At time t1, the user interface 25 is in the state of displaying, through its display screen, the below subtitle text (zzz) ("shingata-korona-uirusu-wakuchin-no (\n) daikibo-sessyu-sentaa-no-yoyaku-ga-kyoo-kara") in two lines. A user performs a slash action UA1 on a portion (aaaa) ("kyoo-kara") of the displayed subtitle text. The slash action UA1 here refers to a finger operation of touching and dragging the subject from an upper right location to a lower left location.

(zzz) 新型コロナウイルスワクチンの¥n大 規模接種セン ターの予約が今日 から
(aaaa) 今日から

The user interface 25 detects the slash action UA1 to acquire the start position and the end position of this slash action UA1, and generates the action data containing the start position and the end position (step ST8-1). Subsequently, the user interface 25 sends the action data to the correction request receiver 26.

The correction request receiver 26 receives the action data (step ST8-2), and determines whether or not the slash action has been done based on the start position and the end position in the action data (step ST8-3). As a concrete example, if the start position in the action data indicates an upper right location and the end position indicates a lower left location, the slash action may be determined.

Upon determining that the slash action has been done, the correction request receiver 26 specifies the correction subject range in the subtitle text based on the display position of the subtitle text and from the area at or near the start position and the end position in the action data. For example, the correction request receiver 26 calculates a center position between the start position and the end position in the action data, obtains a character position in the subtitle text that is the closest to the center position, and sets a group of several words before and after this character position to be the correction subject range. Also, upon determining that the slash action has been done, the correction request receiver 26 determines that the request type is a split request type, and sends this request type and the correction subject range to the regenerator 24b.

With the request type being a split request type, the regenerator 24b estimates, based on the received correction subject range and using the archive datasets 21a, a plausible split position among portions of the correction subject range, and regenerates a subtitle text (step ST8-4).

More specifically, upon obtaining the below correction subject range (bbbb) ("no-yoyaku-ga-kyoo-kara"), the regenerator 24b calculates a split estimation score for each word in the manner as described above, and estimates a split position that corresponds to the position showing the highest split estimation score among the positions in the correction subject range excluding the currently adopted split position. In this example, the position immediately preceding the subtitle text (cccc) ("kyoo-kara") is estimated to be the split position. The regenerator 24b, if the number of lines after the split (e.g., three lines) exceeds the number of lines (e.g., two lines) that can be displayed on one screen, deletes such an excess portion (e.g., the text (dddd) ("kyoo-kara") at the third line) from the currently displayed subtitle text and generates the update information for the archive datasets 21a accordingly. Also, while it is not the illustrated example, if the character number after the split exceeds the character number that can be displayed in one line, the regenerator 24*b* deletes the excess portion from the same line and generates the update information for the archive datasets 21*a* accordingly. For example, there is an instance where adding a split in the first line of the displayed two-line subtitle text and moving a portion of the subtitle text in the first line to the second line might cause the resulting subtitle text in the second line to exceed the character number that can be displayed in one line. In such instances, the excess portion may be deleted from the subtitle text in the second line.

(bbbb) の予約が今日から

(cccc) 今日から

(dddd) 今日から

The regenerator 24*b* regenerates, based on the estimated split position (the position immediately preceding (eeee) below ("kyoo-kara")), a subtitle text from the archive datasets 21*a* corresponding to the currently displayed subtitle text (ffff) below ("shingata-korona-uirusu-wakuchin-no (\n) daikibo-sessyu-sentaa-no-yoyaku-ga-kyoo-kara"). The generator 24*a* here regenerates the below subtitle text (gggg) ("shingata-korona-uirusu-wakuchin-no (\n) daikibo-sessyu-sentaa-no-yoyaku-ga").

(eeee) 今日から

(ffff) 新型コロナウ イルスワクチン の¥n大規模 接種センター の予約が今日 から

(gggg) 新型コロナウ イルスワクチン の¥n大規模 接種センター の予約が

(Time t2)

The user interface 25 subsequently presents the below regenerated subtitle text (hhhh) ("shingata-korona-uirusu-wakuchin-no (\n) daikibo-sessyu-sentaa-no-yoyaku-ga") to the user (step ST8-5).

(hhhh) 新型コロナ ウイルスワクチ ンの¥n大規 模接種セン ターの予約が

The archive updater 23 updates the archive datasets 21*a* stored in the archive 21, based on the regenerated subtitle text (step ST8-6). For example, the archive updater 23 updates the archive data sequence based on the update information for the archive datasets 21*a*.

(Time t3)

After displaying the subtitle text at time t2, the user interface 25 presents the newly generated subtitle text, i.e., (iiii) below ("kyoo-kara-sutaato-shimashita"), to the user. The subtitle text for time t3 includes, at its head, the subtitle text (jjjj) below ("kyoo-kara") that has been deleted according to the slash action UA1 at time t1. Note that, if there has been no slash action UA1, a subtitle text presented at time t3*p* corresponding to time t3 does not include the subtitle text (kkkk) ("kyoo-kara") at its head; namely, the subtitle text (llll) ("sutaato-shimashita") is presented.

(iiii) 今日からスタ ートしました

(jjjj) 今日から

(kkkk) 今日から

(llll) スタートしました

An example of the operations to split a subtitle text from time t1 to time t3 has been described. Next, an example of the operations to concatenate a subtitle text from time t4 to time t6 will be described.

(Time t4)

At time t4, the user interface 25 is in the state of displaying, through its display screen, the below subtitle text (mmmm) ("tookyoo-kaijyoo-tonaru-chiyodaku-no (\n) ootemachi-goodoochoosya-dewa-sessyu-ni-ataru") in two lines. A user performs a swipe action UA2 on a free space located on the right side of a portion (nnnn) ("chiyodaku-no") of the displayed subtitle text. The swipe action UA2 here refers to a finger operation of touching and sweeping from the right to the left.

(mmmm) 東京会場とな る千代田区の¥n 大手町合同庁舎 では接種に当たる

(nnnn) ・・・千代田区の

The user interface 25 detects the swipe action UA2 to acquire the start position and the end position of this swipe action UA2, and generates the action data containing the start position and the end position (step ST8-1). Subsequently, the user interface 25 sends the action data to the correction request receiver 26.

The correction request receiver 26 receives the action data (step ST8-2), and determines whether or not the swipe action has been done based on the start position and the end position in the action data (step ST8-3). As a concrete example, if the start position and the end position in the action data are substantially equal to each other in height, and the start position is located more rightward than the end position, the swipe action may be determined to have been done.

Upon determining that the swipe action has been done, the correction request receiver 26 specifies the correction subject range in the subtitle text based on the display position of the subtitle text and from the start position in the action data. For example, the correction request receiver 26 specifies a character position in the subtitle text that is the closest to the start position in the action data, and sets a group of several words before and after this character position to be the correction subject range. Also, upon determining that the swipe action has been done, the correction request receiver 26 determines that the request type is a concatenation request type, and sends this request type and the correction subject range to the regenerator 24*b*.

With the request type being a concatenation request type, the regenerator 24*b* estimates, based on the received correction subject range and using the archive datasets 21*a*, a concatenation position and also a split position after the concatenation, and regenerates a subtitle text (step ST8-4).

More specifically, the regenerator 24*b* re-estimates the current split position contained in the archive datasets 21*a* corresponding to the obtained correction subject range, i.e., (oooo) below ("jyoo-tonaru-chiyodaku-no-ootemachi-goodoochoosya-dewa"), to be a concatenation position. Also, for this obtained correction subject range (pppp) below ("jyoo-tonaru-chiyodaku-no-ootemachi-goodoochoosya-dewa"), the regenerator 24*b* calculates a split estimation score for each word in the manner as described above and specifies, as a re-estimated split position after the concatenation, the position showing the highest split estimation score among the positions in the correction subject range excluding the currently adopted split position. In this example, the position immediately preceding the subtitle text (qqqq) below ("dewa") is re-estimated to be the split position. While it is not the illustrated example, if the character number after the split exceeds the character number that can be displayed in one line, the regenerator 24*b* deletes the excess portion from the same line and generates the update information for the archive datasets 21*a* accordingly. For example, suppose that a two-line subtitle text is currently displayed and the number of characters thereof in the first line is close to the character number that can be displayed in one line. In this case, if a concatenation request type is given in relation to the subtitle text in the first line, calculating a split estimation score for each word in the correction subject range and adopting the re-estimated split position might cause the resulting subtitle text in the first line to exceed the character number that can be displayed in one line. In such instances, the excess portion may be deleted from the subtitle text in the first line and moved to the subtitle text in the second line.

(oooo) 場となる千代田 区の大手町合 同庁舎では

(pppp) 場となる千代 田区の大手町 合同庁舎では

(qqqq) では

The regenerator 24b then concatenates, based on the re-estimated concatenation position, texts of the subtitle text from the archive datasets 21a corresponding to the currently displayed subtitle text (rrrr) below ("tookyoo-kaijyoo-tonaru-chiyodaku-no (\n) ootemachi-goodoochoogya-dewa-sessyu-ni-ataru").

(rrrr) 東京会場とな る千代田区の¥ n大手町合同庁舎 では接種に当たる

Subsequently, the regenerator 24b regenerates, based on the re-estimated split position (the position immediately preceding (ssss) below ("dewa")), a subtitle text from the archive datasets 21a corresponding to the concatenated subtitle text (tttt) ("tookyoo-kaijyoo-tonaru-chiyodaku-no-ootemachi-goodoochoosya-dewa-sessyu-ni-ataru"). The generator 24a here regenerates the below subtitle text (uuuu) ("tookyoo-kaijyoo-tonaru-chiyodaku-no-ootemachi-goo-doochoosya (\n) dewa-sessyu-ni-ataru").

(ssss) では

(tttt) 東京会場となる 千代田区の大手 町合同庁舎で は接種に当たる

(uuuu) 東京会場となる 千代田区の大手 町合同庁舎¥ n では接種に当たる

(Time t5)

The user interface 25 subsequently presents the below regenerated subtitle text (vvvv) ("tookyoo-kaijyoo-tonaru-chiyodaku-no-ootemachi-goodoochoosya (\n) dewa-sessyu-ni-ataru") to the user (step ST8-5).

(vvvv) 東京会場となる千代田区の大 手町合同庁舎¥ n では接種に当たる

The archive updater 23 updates the archive datasets 21a stored in the archive 21, based on the regenerated subtitle text (step ST8-6). For example, the archive updater 23 updates the archive data sequence based on the update information for the archive datasets 21a.

(Time t6)

After displaying the subtitle text at time t5, the user interface 25 presents the newly generated subtitle text, i.e., (wwww) below ("jieitai-no-ikan-ya-kangokan-ra-ga (\n) hensei-kanketsushiki-o-okonaimashita"≈"The ikan-ya nurses of the self-defense officials . . . held an organization completion ceremony"), to the user.

(wwww) 自衛隊のい かんや看護官 らが¥ n 編成 完結式を行ないました

An example of the operations to concatenate a subtitle text from time t4 to time t6 has been described. In this manner, subtitle texts can be split or concatenated according to user actions.

According to the second embodiment as described above, the user interface 25, serving as a detector, detects an action by a user on a portion of the presented subtitle text and generates action data. The correction request receiver 26, serving as a determiner, determines a correction subject range in the subtitle text and also a request type for either a split or a concatenation of the subtitle text, based on the action data. The regenerator 24b re-estimates a split position or a concatenation position of the subtitle text based on the correction subject range, the request type, and the archive datasets, and regenerates a subtitle text using the re-estimation result. Therefore, the second embodiment can realize, in addition to the advantages of the first embodiment, a further advantage of enabling the split position and the concatenation position of the presented subtitle texts to be easily corrected according to user actions.

Modifications of Second Embodiment

While the second embodiment has assumed that a dragging movement from the upper right location to the lower left location is detected as the slash action UA1, this is not a limitation. For example, a dragging movement from the upper left location to the lower right location may be detected as the slash action UA1. As yet another example, a straight vertical dragging movement from the top to the bottom may be detected as the slash action UA1. That is, any action may be used as the slash action UA1 as long as it indicates the split position. Also, the term "slash action" may be replaced with any term as long as the designated action indicates the split position.

While the second embodiment has assumed that a sweep movement from the right to the left is detected as the swipe action UA2, this is not a limitation. For example, a flick movement from the right toward the left may be detected as the swipe action UA2. As yet another example, a pinch-in movement of having two fingers contact the screen in a laterally opened state and making them approach each other may be detected as the swipe action UA2. That is, any action may be used as the swipe action UA2 as long as it indicates the concatenation position. Also, the term "swipe action" may be replaced with any term as long as the designated action indicates the concatenation position.

Third Embodiment

By comparison, the third embodiment differs from the second embodiment in that it additionally includes a configuration for presenting correction candidates for subtitle texts displayed through the user interface 25, in response to the user action on a part, etc. of the displayed subtitle text. Note that the third embodiment is not limited to this but may be a combination of the first embodiment with the additional configuration.

Figure 8:
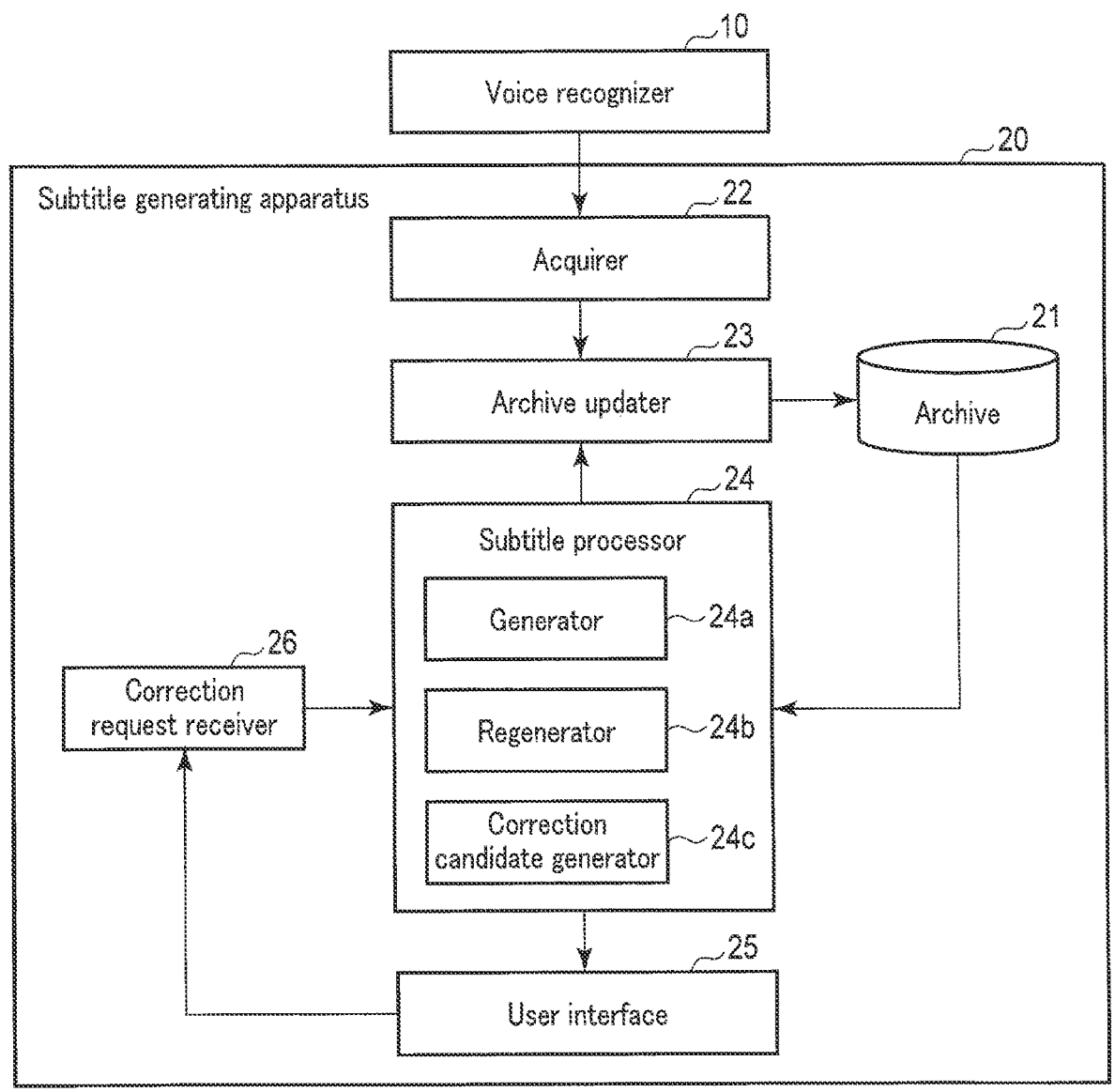
FIG. 8 is a block diagram showing an exemplary subtitle generating apparatus according to a third embodiment.

FIG. 8 is a block diagram showing a subtitle generating apparatus according to the third embodiment.

By comparison, the subtitle generating apparatus 20 shown in FIG. 8 has a configuration differing from the configuration shown in FIG. 5 in that the subtitle processor 24 further includes a correction candidate generator 24c.

Accordingly, the user interface 25 here detects a user action on a portion of the presented subtitle text and generates action data in a manner similar to the above embodiment. The user interface 25 is an example of a detector.

The correction request receiver 26 determines, based on the action data, a correction subject range in the subtitle text. In one example, the correction request receiver 26 performs this determination upon receipt of the action data serving as a correction request. The correction request receiver 26 is an example of a determiner.

The correction candidate generator 24c generates, based on the correction subject range and using the archive datasets 21a, one or more correction candidates for the correction subject range and estimates a split position of the subtitle texts reflecting the respective correction candidates.

Figure 9:
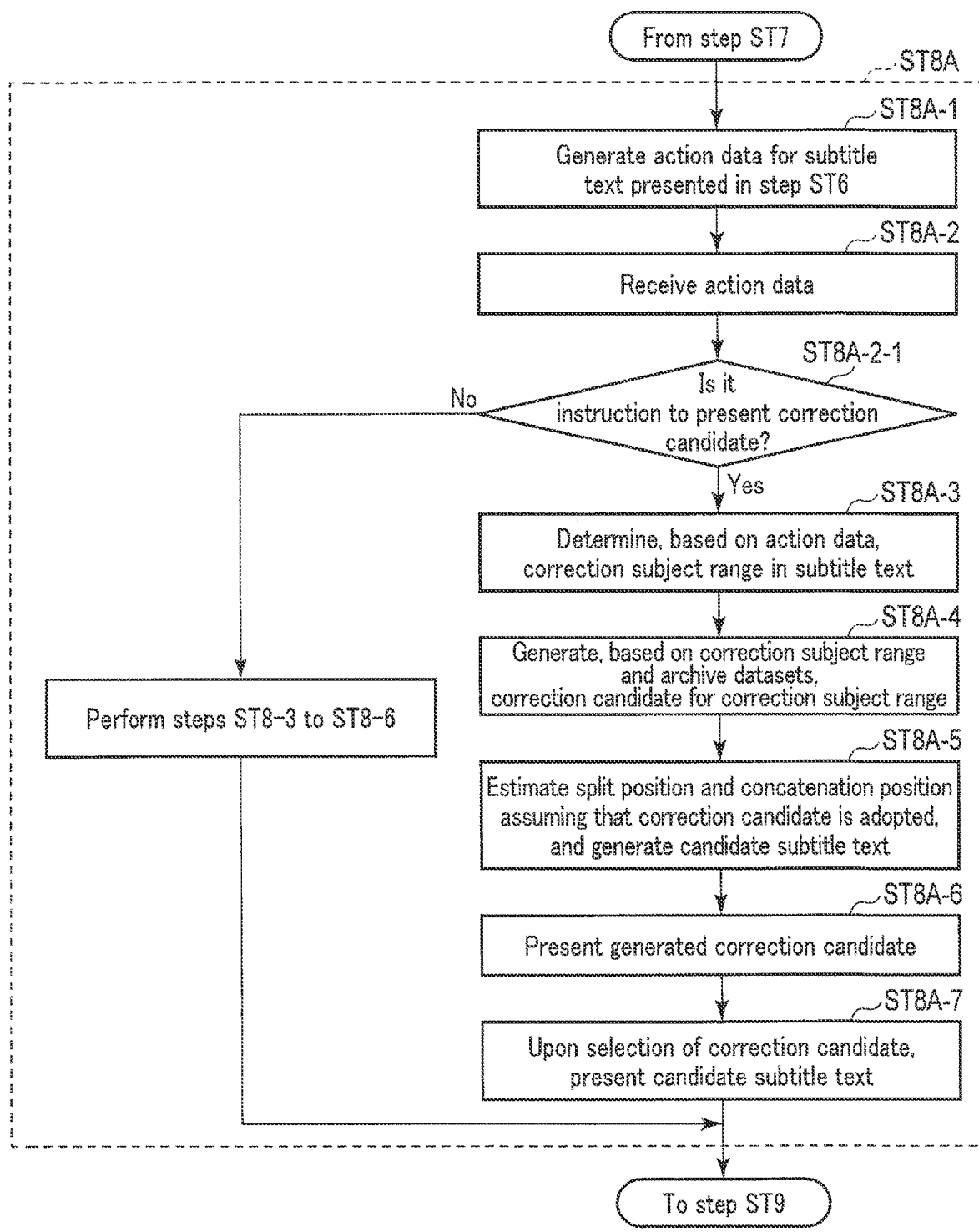
FIG. 9 is a flowchart for explaining an exemplary operation in the third embodiment.
Figure 10:
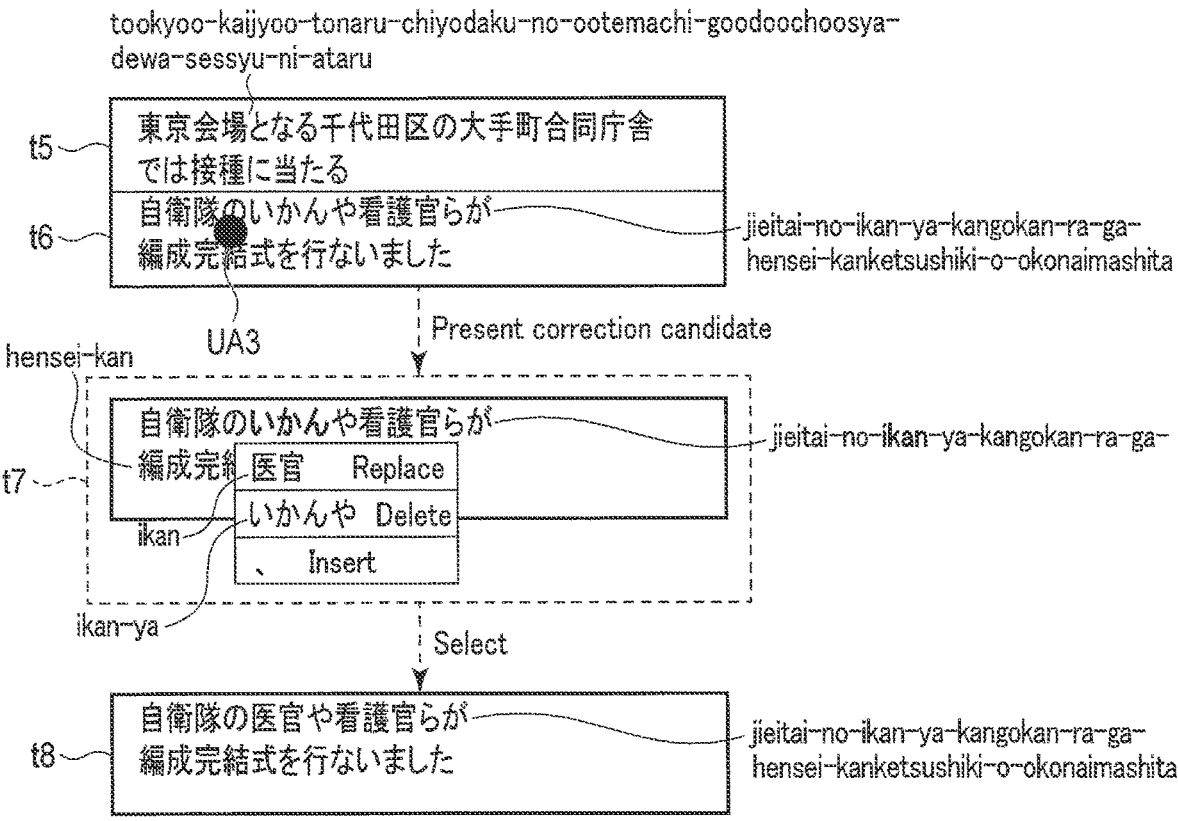
FIG. 10 is a schematic diagram for explaining an exemplary operation in the third embodiment.

Operations of the subtitle generating apparatus 20 configured as above will be described with reference to the flowchart in FIG. 9 and the schematic diagram in FIG. 10. In particular, the operations of the present embodiment are performed as step ST8A set between steps ST7 and ST9 described above. Step ST8A is constituted by steps ST8A-1 to ST8A-7 and ST8-3 to ST8-6, which proceed as follows.
(Steps ST8A-1 to ST8A-2)

Steps ST8A-1 to ST8A-2 are performed in the same manner as steps ST8-1 to ST8-2 described above. That is, the user interface 25 here detects a user action on a portion of the displayed subtitle text and generates action data. The correction request receiver 26 receives the action data from the user interface 25.
(Step ST8A-2-1)

The correction request receiver 26 determines, based on the action data, whether or not this action data is an instruction to present a correction candidate. If it is determined that the action data is not such an instruction, steps ST8-3 to ST8-6 are performed as described for the above second embodiment to thereby finish step ST8A, and the processing advances to step ST9. On the other hand, if it is determined that the action data is an instruction to present a correction candidate, the processing transitions to step ST8A-3. Note that this step ST8A-2-1 may be omitted in the instances where the processing according to the second embodiment is not performed.
(Step ST8A-3)

Next, the correction request receiver 26 determines, based on the action data, a correction subject range in the subtitle text and sends this correction subject range to the correction candidate generator 24c.
(Step ST8A-4)

The correction candidate generator 24c generates, based on the correction subject range in the subtitle text and using the archive datasets 21a, one or more correction candidates for the correction subject range.
(Step ST8A-5)

The correction candidate generator 24c, for each of the generated correction candidates, estimates a split position and a concatenation position of the subtitle text on the assumption that the correction candidate is adopted and generates a candidate subtitle text using the split position and the concatenation position. The correction candidate generator 24c then sends the correction candidates and the candidate subtitle texts to the user interface 25. Here, one or more correction candidates and the candidate subtitle texts corresponding to the respective correction candidates are sent.
(Step ST8A-6)

The user interface 25 presents the generated one or more correction candidates to the user.
(Step ST8A-7)

The user interface 25, in response to one of the correction candidates being selected according to an action of the user, presents the candidate subtitle text corresponding to the selected correction candidate to the user. The archive updater 23 then updates the archive datasets 21a stored in the archive 21, based on the presented candidate subtitle text. The subtitle generating apparatus 20 thus finishes step ST8A and advances to the above described step ST9.

Next, a concrete example as to how the above described operations are performed for the presentation of correction candidates and the correction of a subtitle text will be explained with reference to the schematic diagram in FIG. 10. An example of the operations to correct a subtitle text from time t6 to time t8 will be described.
(Time t6)

At time t6, the user interface 25 is in the state of displaying, through its display screen, the below subtitle text (xxxx) ("jieitai-no-ikan-ya-kangokan-ra-ga (\n) hensei-kan-ketsushiki-o-okonaimashita") in two lines. A user performs a pointing action UA3 on a portion (yyyy) ("no") of the displayed subtitle text. The pointing action UA3 here refers to an operation of pressing the screen with a finger and then detaching the finger.

(xxxx) 自衛隊のいかんや看護官らが¥n編成完結式 を行ないました
(yyyy) の

The user interface 25 detects the pointing action UA3 to acquire the pointing position of this pointing action UA3 on the screen, and generates the action data containing the pointing position (step ST8A-1). Subsequently, the user interface 25 sends the action data to the correction request receiver 26.

The correction request receiver 26 receives the action data (step ST8A-2), and determines whether or not an instruction to present a correction candidate (the pointing action) has been given based on the pointing position in the action data (step ST8A-2-1). As a concrete example, if there is one pointing position in the action data, it may be determined that a pointing action has been performed. In other words, in the case of a pointing action being performed, the start position and the end position in the action data are identical to each other.

Upon determining that a pointing action has been performed, the correction request receiver 26 determines, based on the action data, a correction subject range in the subtitle text and sends this correction subject range to the correction candidate generator 24c.

For example, the correction request receiver 26 estimates a section having the largest error ratio among sections in the area around the pointing position designating the portion (zzzz) ("no") below, and sets the character string (aaaaa) ("no-ikan-ya") corresponding to this section to be the correction subject range (step ST8A-3). However, this is not a limitation. The correction request receiver 26 may specify a character position in the displayed subtitle text that is the closest to the pointing position, and sets a group of several words before and after this character position to be the correction subject range. Also, upon determining that a pointing action has been performed, the correction request receiver 26 sends the correction subject range (bbbbb) ("no-ikan-ya") to the correction candidate generator 24c.

(zzzz) の
(aaaaa) のいかんや
(bbbbb) のいかんや

The correction candidate generator 24c then acquires the archive datasets 21a corresponding to the displayed subtitle text from the archive 21. The correction candidate generator 24c estimates (generates) candidate character strings (correction candidates) for the correction subject range, by applying a learning model BERT that has been trained beforehand to the displayed subtitle text in which a portion corresponding to the correction subject range is masked (step ST8A-4). Here, BERT stands for "Bidirectional Encoder Representations from a Transformer". In this example, the correction candidate generator 24c estimates, as the correction candidates for the below correction subject range (ccccc) ("no-ikan-ya"), a candidate (ddddd) below ("no-ikan-ya") in which a replacement with (eeeee) below ("ikan"≈"medical officers") has been done, a candidate (fffff) below ("no") in which (ggggg) below has been deleted, and a candidate (hhhhh) below ("no, ikan-ya") in which (iiiii) below has been added. Note that the symbol (jjjjj) below in Japanese is not pronounced, as it is similar to "," (a comma) in English, and it represents a break within a sentence. Also, the correction candidate generator 24c estimates a split position of each of the subtitle texts reflecting the respective three correction candidates, namely, the subtitle text (kkkkk) below ("jieitai-no-ikan-ya-kangokan-ra-ga-hensei-kanketsushiki-o-okonaimashita" s "The medical officers and nurses of the self-defense officials . . . held an organization completion ceremony"), the subtitle text (lllll) below ("jieitai-no-kangokan-ra-ga-hensei-kanketsushiki-o-okonaimashita"≈"The nurses of the self-defense officials . . . held an organization completion ceremony"), and the subtitle text (mmmmm) below ("jieitai-no, ikan-ya-kangokan-ra-ga-hensei-kanketsushiki-o-okonaimashita"≈"The ikan-ya nurses, of the self-defense officials, . . . held an organization completion ceremony"). In this case, each split position is estimated at a position immediately preceding the portion (nnnnn) below ("hensei-kanketsushiki": "an organization completion ceremony"), which is the same as the position before the correction.

(ccccc) のいかんや
(ddddd) の医官や
(eeeee) 医官
(fffff) の
(ggggg) いかんや
(hhhhh) の、いかんや
(iiii) 、
(jjjjj) 、
(kkkkk) 自衛隊の医官 や看護官らが 編成完結式 を行ないました
(lllll) 自衛隊の看護 官らが編成完 結式を行な いました
(mmmmm) 自衛隊の、いかんや看護官 らが編成完結 式を行ない ました
(nnnnn) 編成完結式

Subsequently, the correction candidate generator 24c generates the first to third candidate subtitle texts according to the three correction candidates and the associated split position (step ST8A-5). The first candidate subtitle text is the below subtitle text (ooooo) ("jieitai-no-ikan-ya-kangokan-ra-ga (\n) hensei-kanketsushiki-o-okonaimashita"). The second candidate subtitle text is the below subtitle text (ppppp) ("jieitai-no-kangokan-ra-ga (\n) hensei-kanketsushiki-o-okonaimashita"). The third candidate subtitle text is the below subtitle text (qqqqq) ("jieitai-no, ikan-ya-kangokan-ra-ga (\n) hensei-kanketsushiki-o-okonaimashita"). The correction candidate generator 24c sends the correction candidates and the candidate subtitle texts to the user interface 25.

(ooooo) 自衛隊の医官 や看護官ら が￥n編成 完結式を行 ないました
(ppppp) 自衛隊の看 護官らが￥n 編成完結式を 行ないました
(qqqqq) 自衛隊の、いかんや看 護官らが￥n 編成完結式を 行ないました
(Time t7)

The user interface 25 presents the generated three correction candidates to the user (step ST8A-6).
(Time t8)

The below correction candidate (rrrrr) ("no-ikan-ya"), in which a replacement with (sssss) below ("ikan"≈"medical officers") has been done, is selected according to an action of the user. In response, the user interface 25 presents the candidate subtitle text corresponding to this correction candidate to the user. In this example, the first candidate subtitle text (ttttt) ("jieitai-no-ikan-ya-kangokan-ra-ga (\n) hensei-kanketsushiki-o-okonaimashita") is displayed.

(rrrrr) の医官や
(sssss) 医官
(ttttt) 自衛隊の医官 や看護官らが￥ n編成完結式 を行ないました

An example of the operations to correct a subtitle text from time t6 to time t8 has been described. In this manner, subtitle texts can be corrected according to user actions.

According to the third embodiment as described above, the user interface 25, serving as a detector, detects an action by a user on a portion of the presented subtitle text and generates action data. The correction request receiver 26, serving as a determiner, determines a correction subject range in the subtitle text based on the action data. The correction candidate generator 24c generates, based on the correction subject range and using the archive datasets 21a, one or more correction candidates for the correction subject range and estimates a split position of the subtitle texts reflecting the respective correction candidates. Therefore, the third embodiment can realize, in addition to the advantages of the first and the second embodiments, a further advantage of enabling the correction candidates for the presented subtitle texts to be easily generated according to user actions. Moreover, by allowing the correction candidates to be selected according to user actions, the third embodiment realizes easy corrections to the subtitle texts.

Fourth Embodiment

Figure 11:
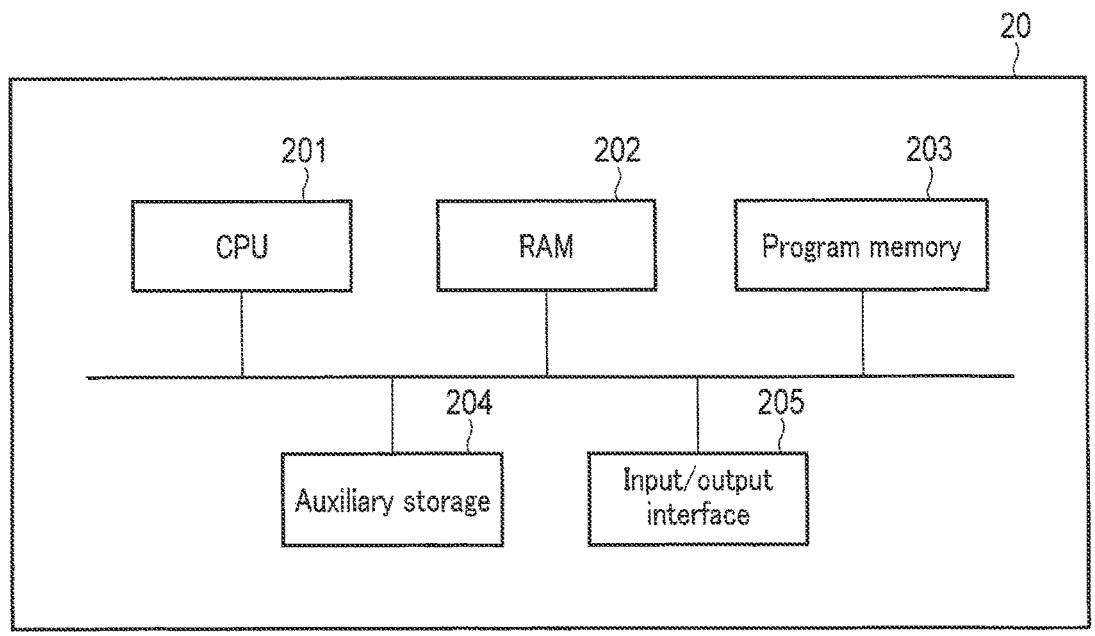
FIG. 11 is a diagram showing an exemplary hardware configuration of a subtitle generating apparatus according to a fourth embodiment.

FIG. 11 is a block diagram showing an exemplary hardware configuration of a subtitle generating apparatus according to the fourth embodiment. The fourth embodiment may be understood as an implementation example of the first to third embodiments, in which the subtitle generating apparatus 20 is realized by a computer.

The subtitle generating apparatus 20 includes, as hardware components, a central processing unit (CPU) 201, a random access memory (RAM) 202, a program memory 203, an auxiliary storage 204, and an input/output interface 205. The CPU 201 communicates with the RAM 202, the program memory 203, the auxiliary storage 204, and the input/output interface 205 via a bus. In other words, the subtitle generating apparatus 20 according to the embodiment is realized by a computer having such a hardware configuration.

The CPU 201 is an example of a general-purpose processor. The RAM 202 is used by the CPU 201 as a working memory. Examples of the RAM 202 include a volatile memory such as a synchronous dynamic random access memory (SDRAM). The RAM 202 may be employed as the archive 21 to store archive datasets. The program memory 203 stores one or more subtitle generating programs for realizing features or components according to each embodiment. For example, such a subtitle generating program or programs may cause the computer to function as each of the above described means including the archive 21, the acquirer 22, the archive updater 23, the subtitle processor 24, and the user interface 25. The program memory 203 may be a read-only memory (ROM), a part of the auxiliary storage 204, or their combination. The auxiliary storage 204 is a non-transitory data storage. Examples of the auxiliary storage 204 include a nonvolatile memory such as a hard disk drive (HDD) or a solid state drive (SSD). Note that each of the RAM 202, the program memory 203, and the auxiliary storage 204 is not required to be a component internally provided within the computer but may be realized as an external component provided outside the computer.

The input/output interface 205 is an interface for enabling a connection to one or more other devices. The input/output interface 205 may be used for connections to, for example, a keyboard, a mouse, and a display.

The one or more subtitle generating programs stored in the program memory include computer-executable instructions. The subtitle generating programs (computer-executable instructions), upon being executed by processing circuitry, i.e., the CPU 201, cause the CPU 201 to perform given processes. For example, the subtitle generating programs, upon being executed by the CPU 201, cause the CPU 201 to perform the series of processes explained in relation to each component in FIGS. 1, 5, and 8. For example, the computer-executable instructions included in the subtitle generating programs, upon being executed by the CPU 201, cause the CPU 201 to perform a subtitle generating method. The subtitle generating method may include steps corresponding to the functions of the respective components described above, such as the archive 21, the acquirer 22, the archive updater 23, the subtitle processor 24, the generator 24*a*, and the user interface 25. The subtitle processor 24 here may also include the regenerator 24*b* and the correction candidate generator 24*c*, in addition to the generator 24*a*. The subtitle generating method may further include steps corresponding to the functions of the correction request receiver 26. The subtitle generating method may include any steps shown in FIGS. 3, 6, and 9 as appropriate.

The subtitle generating programs may be stored in one or more computer-readable storage media and provided to the computer, i.e., the subtitle generating apparatus 20. In this case, the subtitle generating apparatus 20 may further include a drive (not illustrated) for reading data from the storage media so that it acquires the subtitle generating programs from the storage media. Examples that may be discretionarily used as the storage media include a magnetic disk, an optical disk (such as CD-ROM, CD-R, CD-RW, DVD-RAM, DVD-ROM, and DVD-R), a magneto-optical disk (such as MO), and a semiconductor memory. Each storage medium may be called a non-transitory computer readable storage medium. The subtitle generating programs may be stored in one or more servers on a communication network so that the subtitle generating apparatus 20 downloads the subtitle generating programs from such servers via the input/output interface 205.

The processing circuitry to execute the subtitle generating programs is not limited to a general-purpose computer such as the one employed for the CPU 201, but may be a dedicated hardware processor as represented by an application specific integrated circuit (ASIC). The term "processing circuitry" or "processor" includes at least one general-purpose hardware processor, at least one dedicated hardware processor, and a combination of at least one general-purpose hardware processor and at least one dedicated hardware processor. In the example shown in FIG. 11, the combination of the CPU 201, the RAM 202, and the program memory 203 corresponds to the processing circuitry.

According to at least one embodiment described above, the burden of making corrections for improved subtitle readability can be mitigated in real-time subtitle preparation from voice recognition results.

While certain embodiments have been described, they have been presented by way of example only, and are not intended to limit the scope of the inventions. Indeed, the novel embodiments described herein may be embodied in a variety of other forms. Furthermore, various omissions, substitutions, and changes in the form of the embodiments may be made without departing from the spirit of the inventions. The accompanying claims and their equivalents are intended to cover such forms or modifications as would fall within the scope and spirit of the inventions.

What is claimed is:

1. A subtitle generating apparatus comprising:
processing circuitry configured to:
sequentially acquire texts from voice recognition results,
store the texts as archive datasets,
estimate a split position and a concatenation position of the texts from one or more of the archive datasets, and generate a subtitle text from said one or more of the archive datasets based on the split position and the concatenation position, and
update the archive datasets based on the split position and the concatenation position; and
a display configured to display the subtitle text,
wherein:
the processing circuitry is configured to:
continue estimation of the concatenation position so as to concatenate the texts in the archive datasets, until a number of characters of an obtained concatenated text reaches a threshold character number or greater, and
subject the concatenated text to one or both of a morphological analysis and a dependency parsing, generate a feature vector of each word based on a result of the analysis and the parsing, calculate a split estimation score for each word using the feature vector, and estimate the split position based on the split estimation score,
the split estimation score for said each word is calculated using an LSTM model adapted to take into account a context before the word, a context after the word, or a context before and after the word, and
the feature vector includes a word index assigned to said each word from the beginning of a sentence, a character length, a word class, and a result of dependency parsing.

2. The subtitle generating apparatus according to claim 1, wherein:
the archive datasets comprise the texts and an acquisition date and time of the texts, and
the processing circuitry is configured to estimate the concatenation position so as to concatenate the texts in the archive datasets that have not been displayed for a predetermined period of time or longer since the acquisition date and time.

3. The subtitle generating apparatus according to claim 1, wherein the processing circuitry is configured such that, in a case where a number of the archive datasets which contain texts not yet presented as subtitle texts is less than a threshold, the processing circuitry estimates the split position by calculating the split estimation score.

4. The subtitle generating apparatus according to claim 1, wherein the processing circuitry is configured to estimate the split position for the concatenated text according to a fixed character number differing from the threshold character number.

5. The subtitle generating apparatus according to claim 4, wherein the processing circuitry is configured se that if to estimate the split position in accordance with the fixed character number in a case where a number of the archive datasets which contain texts not yet presented as subtitle texts is equal to or greater than a threshold.

6. The subtitle generating apparatus according to claim 1, wherein the processing circuitry is configured to:
detect a user action on a portion of the displayed subtitle text and generate action data,
determine, based on the action data, a correction subject range in the subtitle text and a request type for either a split or a concatenation of the subtitle text, and
re-estimate the split position or the concatenation position of the subtitle text based on the correction subject range, the request type, and the archive datasets, and regenerate the subtitle text using a re-estimation result.

7. The subtitle generating apparatus according to claim 1, wherein the processing circuitry is configured to:
- detect a user action on a portion of the displayed subtitle text and generate action data,
- determine, based on the action data, a correction subject range in the subtitle text, and
- generate, based on the correction subject range and using the archive datasets, a correction candidate for the correction subject range, and estimate a split position of the subtitle text reflecting the correction candidate.

8. A subtitle generating method executed under control of a processing circuit of a subtitle generating apparatus, the subtitle generating apparatus including the processing circuit and a display, and the method comprising:
- sequentially acquiring texts from voice recognition results;
- storing the texts as archive datasets;
- estimating a split position and a concatenation position of the texts from one or more of the archive datasets;
- generating a subtitle text from said one or more of the archive datasets based on the split position and the concatenation position;
- updating the archive datasets based on the split position and the concatenation position; and
- displaying the subtitle text on the display, wherein:
the estimating comprises:
- continuing estimation of the concatenation position so as to concatenate the texts in the archive datasets, until a number of characters of an obtained concatenated text reaches a threshold character number or greater,
- subjecting the concatenated text to one or both of a morphological analysis and a dependency parsing, generating a feature vector of each word based on a result of the analysis and the parsing, and calculating a split estimation score for each word using the feature vector, and
- estimating the split position based on the split estimation score, the split estimation score for said each word is calculated using an LSTM model adapted to take into account a context before the word, a context after the word, or a context before and after the word, and
the feature vector includes a word index assigned to said each word from the beginning of a sentence, a character length, a word class, and a result of dependency parsing.

9. A non-transitory computer readable storage medium storing computer executable instructions which, upon being executed by a processor, control the processor to perform processes comprising:
- sequentially acquiring texts from voice recognition results;
- storing the texts as archive datasets;
- estimating a split position and a concatenation position of the texts from one or more of the archive datasets;
- generating a subtitle text from said one or more of the archive datasets based on the split position and the concatenation position;
- updating the archive datasets based on the split position and the concatenation position; and
- displaying the subtitle text on a display, wherein:
the estimating comprises:
- continuing estimation of the concatenation position so as to concatenate the texts in the archive datasets, until a number of characters of an obtained concatenated text reaches a threshold character number or greater,
- subjecting the concatenated text to one or both of a morphological analysis and a dependency parsing, generating a feature vector of each word based on a result of the analysis and the parsing, and calculating a split estimation score for each word using the feature vector, and
- estimating the split position based on the split estimation score, the split estimation score for said each word is calculated using an LSTM model adapted to take into account a context before the word, a context after the word, or a context before and after the word, and
the feature vector includes a word index assigned to said each word from the beginning of a sentence, a character length, a word class, and a result of dependency parsing.

* * * * *